(12) United States Patent
Ohashi et al.

(10) Patent No.: US 12,444,495 B2
(45) Date of Patent: Oct. 14, 2025

(54) MEDICAL SERVICE SUPPORT DEVICE, MEDICAL SERVICE SUPPORT METHOD, AND PROGRAM

(71) Applicant: FUJIFILM Corporation, Tokyo (JP)

(72) Inventors: Yosuke Ohashi, Tokyo (JP); Shinichi Komiyama, Tokyo (JP); Chieko Iwanaga, Tokyo (JP); Yuma Hori, Tokyo (JP); Tatsuya Kobayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 137 days.

(21) Appl. No.: 18/331,951

(22) Filed: Jun. 9, 2023

(65) Prior Publication Data
US 2023/0317263 A1    Oct. 5, 2023

Related U.S. Application Data

(63) Continuation of application No. PCT/JP2021/041780, filed on Nov. 12, 2021.

(30) Foreign Application Priority Data

Dec. 14, 2020 (JP) ................. 2020-206815

(51) Int. Cl.
  *G16H 40/20* (2018.01)
  *A61B 90/70* (2016.01)
  *G16H 40/40* (2018.01)

(52) U.S. Cl.
  CPC ............. *G16H 40/20* (2018.01); *A61B 90/70* (2016.02); *G16H 40/40* (2018.01); *A61B 2090/701* (2016.02)

(58) Field of Classification Search
  CPC ........ G16H 40/20; G16H 40/40; A61B 90/70; A61B 2090/701
  See application file for complete search history.

(56) References Cited

U.S. PATENT DOCUMENTS

| | | | |
|---|---|---|---|
| 2010/0030573 A1* | 2/2010 | Araki ................. | G06Q 10/1093 705/28 |
| 2011/0288885 A1 | 11/2011 | Araki et al. | |
| 2020/0005936 A1 | 1/2020 | Hanajima | |

FOREIGN PATENT DOCUMENTS

| | | |
|---|---|---|
| CN | 101217320 B | * 12/2010 |
| JP | 2006318038 | 11/2006 |

(Continued)

OTHER PUBLICATIONS

Chi et al. "Low-power transceiver analog front-end circuits for bidirectional high data rate wireless telemetry in medical endoscopy applications." Institute of Microelectronics. Tsinghua University, Beijing 100084, China IEEE transactions on bio-medical engineering 54.7: 1291-9. (Jul. 2007) (Year: 2007).*

(Continued)

*Primary Examiner* — Linh Giang Le
(74) *Attorney, Agent, or Firm* — JCIPRNET

(57) ABSTRACT

The medical service support device includes a processor and a memory connected to or built into the processor. The processor is configured to acquire low operation rate medical device specification information capable of specifying a low operation rate medical device, which is a medical device of which a standard operation degree falls below a threshold value among a plurality of the medical devices used in an endoscope handling service, and output medical service support information obtained based on the low operation rate medical device specification information.

17 Claims, 22 Drawing Sheets

(56) References Cited

FOREIGN PATENT DOCUMENTS

| | | |
|---|---|---|
| JP | 2010039560 | 2/2010 |
| JP | 2020003994 | 1/2020 |
| WO | 2011048812 | 4/2011 |

OTHER PUBLICATIONS

"International Search Report (Form PCT/ISA/210) of PCT/JP2021/041780", mailed on Feb. 1, 2022, with English translation thereof, pp. 1-5.

"Written Opinion of the International Searching Authority (Form PCT/ISA/237) of PCT/ JP2021/041780", mailed on Feb. 1, 2022, with English translation thereof, pp. 1-8.

"Office Action of Japan Counterpart Application", issued on Jun. 17, 2025, with English translation thereof, p. 1-p. 6.

* cited by examiner

MEDICAL SERVICE SUPPORT DEVICE, MEDICAL SERVICE SUPPORT METHOD, AND PROGRAM

CROSS-REFERENCE TO RELATED APPLICATIONS

This application is a continuation application of International Application No. PCT/JP2021/041780, filed Nov. 12, 2021, the disclosure of which is incorporated herein by reference in its entirety. Further, this application claims priority under 35 USC 119 from Japanese Patent Application No. 2020-206815 filed Dec. 14, 2020, the disclosure of which is incorporated by reference herein.

BACKGROUND

1. Technical Field

The present invention relates to a medical service support device, a medical service support method, and a program.

2. Related Art

JP2010-039560A discloses a medical device management support device including: an examination schedule storing unit that stores an examination schedule including a start time point and an end time point of each examination; a washing capability storing unit that stores washing capability information that defines washing capability of a washing device that washes an endoscope used in the examination; a washing schedule generation unit that generates a washing schedule for washing a used endoscope, which is generated at the end of each examination, with the washing device having washing capability defined based on the washing capability information stored in the washing capability storing unit according to the examination schedule stored in the examination schedule storing unit; and an endoscope determination unit that determines whether or not there is a shortage of endoscopes to be used in each examination according to an examination start time point specified through the examination schedule and a washing end time point specified through the washing schedule.

SUMMARY

One embodiment according to the present disclosed technology provides a medical service support device, a medical service support method, and a program capable of supporting efficient performance of an endoscope handling service.

A medical service support device according to a first aspect of the present disclosed technology comprises: a processor; and a memory that is connected to or built into the processor, in which the processor is configured to: acquire low operation rate medical device specification information capable of specifying a low operation rate medical device, which is a medical device of which a standard operation degree falls below a threshold value among a plurality of the medical devices used in an endoscope handling service; and output medical service support information obtained based on the low operation rate medical device specification information.

A medical service support method according to a second aspect of the present disclosed technology comprises: acquiring low operation rate medical device specification information capable of specifying a low operation rate medical device, which is a medical device of which a standard operation degree falls below a threshold value among a plurality of the medical devices used in an endoscope procedure service; and outputting medical service support information obtained based on the low operation rate medical device specification information.

A program according to a third aspect of the present disclosed technology that causes a computer to execute a process comprises: acquiring low operation rate medical device specification information capable of specifying a low operation rate medical device, which is a medical device of which a standard operation degree falls below a threshold value among a plurality of the medical devices used in an endoscope procedure service; and outputting medical service support information obtained based on the low operation rate medical device specification information.

BRIEF DESCRIPTION OF THE DRAWINGS

Exemplary embodiments of the technology of the disclosure will be described in detail based on the following figures, wherein.

DETAILED DESCRIPTION

An example of an embodiment of a medical service support device, a medical service support method, and a program according to the present disclosed technology will be described with reference to the accompanying drawings.

First Embodiment

Figure 1:
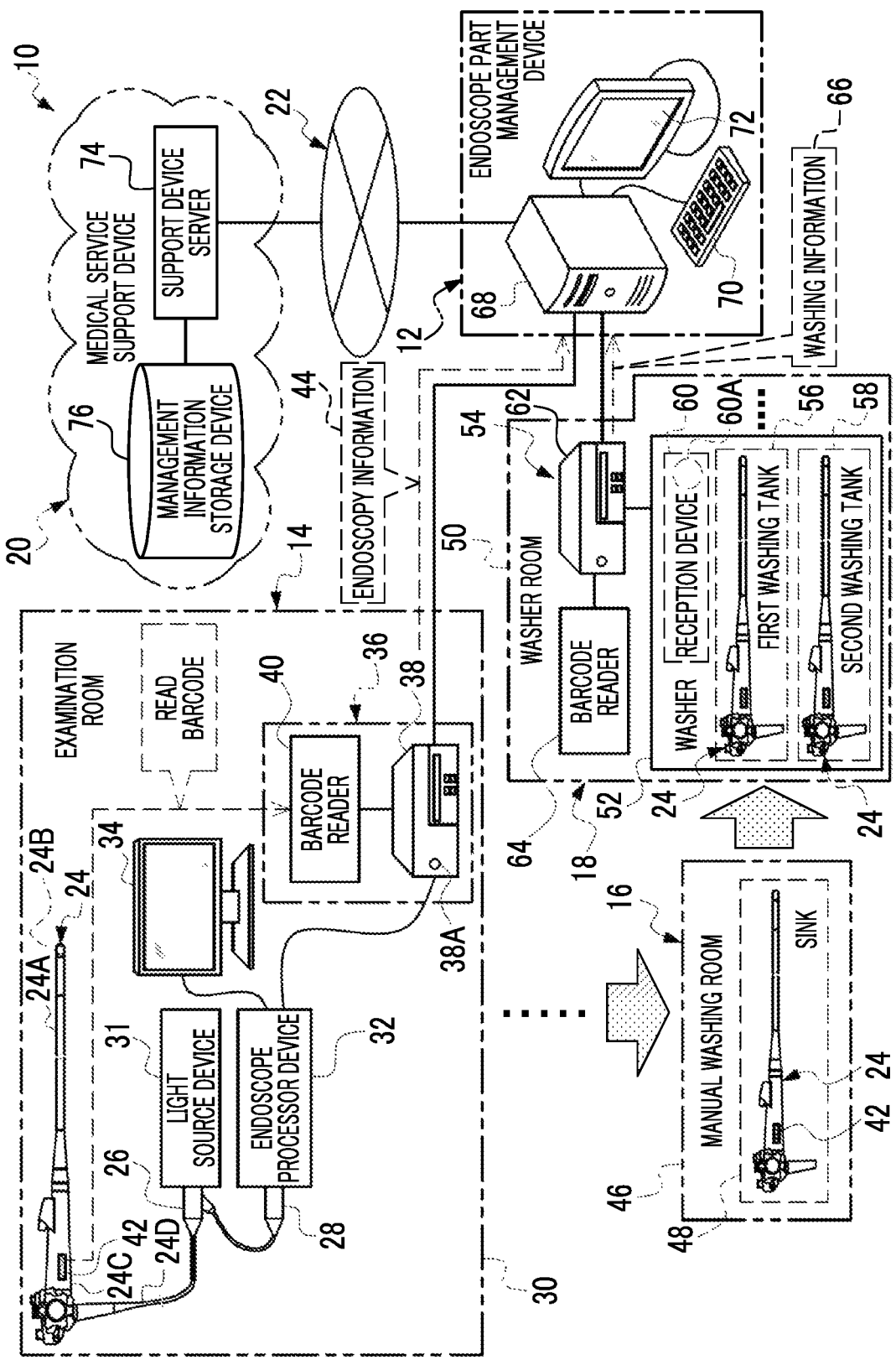
FIG. 1 is a conceptual diagram showing a schematic configuration of a medical service support system.

As an example, as shown in FIG. 1, a medical service support system 10 includes an endoscope part management device 12, a plurality of examination room facilities 14, a manual washing facility 16, an automatic washing facility 18, and a medical service support device 20. Here, the medical service support device 20 is an example of a "medical service support device" according to the present disclosed technology.

The medical service support system 10 is a system that supports an endoscope handling service. In the present first embodiment, the endoscope handling service refers to, for example, a service performed by a person engaged in examination (hereinafter, also referred to as an "endoscopy worker") using an endoscope 24 (hereinafter, also referred to as an "endoscopy") in a medical installation facility (for example, a hospital). The endoscope handling service includes an endoscopy, a manual washing service, and an automatic washing service. The endoscopy is an example of an "endoscope procedure service" according to the present disclosed technology, and is performed by a doctor or the like.

The medical installation facility has a plurality of endoscopes 24, and a type of endoscope 24, which corresponds to an examination item, is used in each of the plurality of examination room facilities 14. Examples of the type of endoscope 24 include an upper gastrointestinal scope, a pancreatic duct scope, a bile duct scope, a duodenal scope, a colon scope, an intracerebral scope, an otolaryngology scope, a bronchial scope, and the like.

The endoscope 24 includes an insertion part 24A, an imaging part 24B, an operation part 24C, and a universal cord 24D. The insertion part 24A is inserted into a subject.

The imaging part 24B is provided at a distal end part of the insertion part 24A. The imaging part 24B includes a complementary metal oxide semiconductor (CMOS) type imaging element. A charge-coupled device (CCD) type imaging element may be used instead of the CMOS type imaging element.

The operation part 24C is installed to be continuous with a proximal end side of the insertion part 24A, and a doctor holds the operation part 24C and performs various operations. By operating the operation part 24C, the insertion part 24A is bent or imaging is performed by the imaging part 24B.

The universal cord 24D is installed to be continuous with the operation part 24C. The universal cord 24D encompasses a light guide (not shown), a fluid tube (not shown), and a signal cable (not shown). Connectors 26 and 28 are provided at an end part of the universal cord 24D. The connector 28 is branched from the connector 26.

A plurality of examination room facilities 14 are provided in the medical installation facility, and each of the examination room facilities 14 includes an examination room 30, a light source device 31, an endoscope processor device 32, a display 34, and an information processing apparatus 36. The light source device 31, the endoscope processor device 32, the display 34, and the information processing apparatus 36 are installed in the examination room 30 and are used in the endoscopy included in the endoscope handling service.

A plurality of information processing apparatuses 36 are present and are provided in each of a plurality of medical sites where the endoscope handling service is performed. In the present first embodiment, one information processing apparatus 36 is assigned to each of the examination rooms 30. In the present first embodiment, the information processing apparatus 36 is an example of a "medical device" according to the present disclosed technology.

The information processing apparatus 36 is an example of an "information processing apparatus" according to the present disclosed technology and is used together with the endoscope 24 in the endoscopy. The information processing apparatus 36 operates every time an endoscopy is performed on one subject in each examination room 30. The information processing apparatus 36 is continuously operated while an endoscopy is performed on one subject. That is, a period from when the operation of the information processing apparatus 36 is started to when the operation of the information processing apparatus 36 is ended corresponds to a period during which an endoscopy is performed on one subject.

The connector 26 is connected to the light source device 31. In a case where the connector 26 is connected to the light source device 31, a light guide and a fluid tube in the universal cord 24D are inserted into the light source device 31. The light source device 31 supplies illumination light, water, and gas to the endoscope 24 via the light guide and the fluid tube. Accordingly, the illumination light is emitted toward a test observation site from an illumination window (not shown) on a distal end surface of the insertion part 24A. Further, water and gas are injected from a nozzle (not shown) on the distal end surface of the insertion part 24A toward the observation window according to the operation performed on the operation part 24C. Here, although an example of the embodiment has been described in which the light source device 31 supplies water and gas to the endoscope 24, this is merely an example, and at least one of water or gas may be supplied to the endoscope 24 from a device other than the light source device.

The connector 28 is connected to the endoscope processor device 32. In a case where the connector 28 is connected to the endoscope processor device 32, a signal cable in the universal cord 24D is electrically connected to the endoscope processor device 32. The endoscope processor device 32 controls the operation of the endoscope 24 by supplying a control signal to the endoscope 24 via a signal cable. Further, the endoscope 24 outputs an imaging signal, which is obtained by causing the imaging part 24B to image the test observation site, to the endoscope processor device 32 via the signal cable.

The endoscope processor device 32 generates a moving image as an image showing the test observation site based on the imaging signal input from the endoscope 24. A frame rate of the moving image is, for example, 30 frames per second (fps). Further, the endoscope processor device 32 generates a still image as an image showing the test observation site in response to an operation performed on the operation part 24C. The endoscope processor device 32 is connected to the display 34 and displays an image, which is generated based on the imaging signal, on the display 34.

In the present first embodiment, although the light source device 31 and the endoscope processor device 32 are separate from the information processing apparatus 36, this is merely an example, and at least one of the light source device 31 and the endoscope processor device 32 may be integrated with the information processing apparatus 36.

The information processing apparatus 36 includes an information processing apparatus main body 38 and a barcode reader 40. The information processing apparatus main body 38 is configured to include a computer including a processor and a storage device. Examples of the processor include a central processing unit (CPU). Examples of the storage device include a combination of a non-volatile memory such as an electrically erasable and programmable read only memory (EEPROM), a solid state drive (SSD), and/or a hard disk drive (HDD), and a volatile memory such as a random access memory (RAM).

An examination start button 38A is provided on the information processing apparatus main body 38. The examination start button 38A is an alternate type push button. Further, the examination start button 38A is turned on at a time of starting an endoscopy for one subject and is turned off at a time of ending an endoscopy on one subject. In a case where the examination start button 38A is turned on, the information processing apparatus main body 38 starts the operation, and in a case where the examination start button 38A is turned off, the information processing apparatus main body 38 stops the operation.

The endoscope part management device 12 is connected to the information processing apparatus main body 38. An information processing apparatus ID, which is an identification (ID) capable of specifying the information processing apparatus main body 38, is assigned to the information processing apparatus main body 38, and the endoscope part management device 12 centrally manages each information processing apparatus main body 38, which is installed in each of the examination rooms 30, by using the information processing apparatus ID.

Further, the endoscope processor device 32 is connected to the information processing apparatus main body 38. That is, the endoscope 24 is connected to the information processing apparatus main body 38 via the endoscope processor device 32. Further, a barcode reader 40 is also connected to the information processing apparatus main body 38.

The information processing apparatus main body 38 is operated under the control of the endoscope part management device 12 and controls the operations of the endoscope processor device 32 and the barcode reader 40. The information processing apparatus main body 38 acquires an image, which is generated based on an imaging signal by the endoscope processor device 32, and outputs the acquired image to the endoscope part management device 12.

A barcode 42 is provided on the endoscope 24. In the example shown in FIG. 1, the barcode 42 is provided on the operation part 24C. The barcode 42 is information in which an endoscope ID that is capable of uniquely specifying the endoscope 24 is encrypted. The barcode 42 is read by the barcode reader 40 in a case where an endoscopy is started.

The barcode reader 40 outputs the endoscope ID obtained by reading the barcode 42 to the information processing apparatus main body 38.

The barcode reader 40 is also capable of reading a barcode (not shown) that is uniquely assigned to the subject. The barcode, which is assigned to the subject (hereinafter, also referred to as a "subject barcode"), is information in which a subject ID that is capable of uniquely specifying the subject is encrypted, and is attached to, for example, a band (for example, a wristband) attached to the subject's wrist or the like. The subject barcode is read by the barcode reader 40 at a time at which an endoscopy is started.

The information processing apparatus main body 38 outputs various information related to the subject specified through the subject ID and endoscopy information 44 associated with various IDs to the endoscope part management device 12. Here, the various IDs refer to the endoscope IDs obtained by reading the barcode 42 with the barcode reader 40, and the subject IDs obtained by reading the subject barcode with the barcode reader 40. Here, the endoscope IDs and the subject IDs are exemplified as various IDs, but the present disclosed technology is not limited to this, and only the endoscope IDs may be used.

Further, examples of various types of information related to the subject include, for example, an image generated by the endoscope processor device 32, an examination start time point, an examination end time point, and the like. The information processing apparatus main body 38 includes a clock (for example, a real-time clock) and acquires the examination start time point and the examination end time point from the clock. For example, the examination start time point is a time point when the examination start button 38A is turned on, and the examination end time point is a time point when the examination start button 38A is turned off.

The manual washing facility 16 includes a manual washing room 46 and a sink 48. The sink 48 is installed in the manual washing room 46, and manual washing of the endoscope 24 is performed in the sink 48. Here, the manual washing refers to work in which an endoscopy worker manually and physically removes stains on the endoscope 24 by using a detergent, a brush, a sponge, or the like.

The automatic washing facility 18 includes a washer room 50, a plurality of washers 52, and a washer management device 54. The plurality of washers 52 and the washer management devices 54 are installed in the washer room 50. The washer 52 is a device that mechanically washes the endoscope 24 on which manual washing is performed. The plurality of washers 52 include a single-endoscope washer that is capable of washing only one endoscope 24 and a dual-endoscope washer that is capable of washing two endoscopes 24 together. The single-endoscope washer is also conventionally referred to as a single washer, and the dual-endoscope washer is also conventionally referred to as a dual washer.

The single-endoscope washer is provided with only one washing tank into which one endoscope 24 is inserted, whereas the dual-endoscope washer is provided with a first washing tank 56 and a second washing tank 58. One endoscope 24 is inserted into each of the first washing tank 56 and the second washing tank 58. Hereinafter, in a case where it is not necessary to distinguish among the washing tank of the single-endoscope washer, the first washing tank 56, and the second washing tank 58, a term "washing tank" will be used without reference numerals.

The washer 52 includes a reception device 60. The reception device 60 includes a plurality of buttons and a dial.

The plurality of buttons include a washing start button 60A. The washing start button 60A is a button that receives an instruction for causing the washer 52 to start washing the endoscope 24 in the washing tank. In a case where the washing start button 60A is turned on, the washer 52 starts the operation. In a case where the washer 52 is operated, the washer 52 sequentially performs washing, rinsing, dehydration, and the like with a detergent for the endoscope 24 in the washing tank according to a default program.

The washing time by the washer 52, that is, the operation time of the washer 52, is designated by operating the dial included in the reception device 60. After a lapse of time designated by operating the dial, the washer 52 stops the operation.

The washer management device 54 includes a washer management device main body 62 and a barcode reader 64. The washer management device main body 62 is configured to include a computer including a processor and a storage device. Examples of the processor include a CPU. Examples of the storage device include a combination of a non-volatile memory such as an EEPROM, an SSD, and/or an HDD, and a volatile memory such as a RAM.

The plurality of washers 52 are connected to the washer management device main body 62, and the washer management device main body 62 centrally manages the plurality of washers 52. For example, the washer management device main body 62 includes a clock and acquires a washing start time point and a washing end time point of each of the plurality of washers 52 from the clock. The washing start time point is a time point when the washing start button 60A of the washer 52 is turned on, and the washing end time point is a time point when the operation of the washer 52 is stopped (for example, a time point when washing of the endoscope 24 in the washing tank is ended).

Here, although an example of the embodiment has been described in which the plurality of washers 52 are centrally managed by the washer management device 54, this is merely an example, and each of a plurality of washer management devices 54 may individually manage the plurality of washers 52, and one washer management device 54 may centrally manage the plurality of washers 52.

Further, here, although a time point when the washing start button 60A is turned on is exemplified as the washing start time point, this is merely an example, and, for example, the washing start time point may be determined according to an instruction given to a device other than the washer management device 54 such as the endoscope part management device 12. Further, here, although a time point when the operation of the washer 52 is stopped is exemplified as the washing end time point, this is merely an example, and the washing end time point may be a time point when a timer for managing the washing time is ended, or a time point when the washing start button 60A is turned off.

A washer ID, which is an ID that is capable of specifying the washer 52, is assigned to each of the plurality of washers 52, and the washer management device main body 62 centrally manages the plurality of washers 52 by using washer IDs.

The barcode reader 64 is connected to the washer management device main body 62. The endoscope part management device 12 is connected to the washer management device main body 62, and the washer management device main body 62 is operated under the control of the endoscope part management device 12 and controls the operation of the plurality of washers 52 and the barcode reader 64.

The barcode 42 of the endoscope 24, on which manual washing is performed, is read by the barcode reader 64. The barcode reader 64 outputs the endoscope ID obtained by reading the barcode 42 to the washer management device main body 62.

The washer management device main body 62 outputs various types of information related to the washer 52 and washing information 66 associated with the endoscope ID corresponding to the endoscope 24 washed by the washer 52 to the endoscope part management device 12. Here, examples of various types of information related to the washer 52 include a washer ID, washing start time point, and washing end time point.

The endoscope part management device 12 is a device that manages a part (endoscope part) that is responsible for the endoscope handling service in a medical installation facility. The endoscope part management device 12 includes an endoscope part management device main body 68, a reception device 70, and a display 72. The display 72 is an example of a "presentation device" according to the present disclosed technology.

As described in detail later, the endoscope part management device main body 68 is a device configured to include a computer. The reception device 70 is connected to the endoscope part management device main body 68. The reception device 70 includes a keyboard, a mouse, a touch panel, and/or the like, and receives an instruction from a user or the like of the endoscope part management device 12. The display 72 is connected to the endoscope part management device main body 68. The display 72 displays various types of information under the control of the endoscope part management device main body 68. Examples of the display 72 include an electro-luminescence (EL) display, a liquid crystal display, and the like.

The endoscope part management device main body 68 acquires the endoscopy information 44 output from the information processing apparatus main body 38 and the washing information 66 output from the washer management device main body 62, and executes a process by using the acquired endoscopy information 44 and washing information 66. In the following, for convenience of explanation, in a case where it is not necessary to distinguish between the endoscopy information 44 and the washing information 66, a term "management target information" will be used without reference numerals.

In the present first embodiment, the endoscope part management device 12 is connected to the medical service support device 20 via a network 22. The network 22 is, for example, the Internet. Note that the network 22 is not limited to the Internet and may be a wide area network (WAN) and/or a local area network (LAN) such as an intranet. Further, the endoscope part management device 12 and the medical service support device 20 may be integrally formed, and the medical service support device 20 may have at least some of the functions of the endoscope part management device 12.

The endoscope part management device main body 68 exchanges information with the medical service support device 20 via the network 22. The medical service support device 20 is realized by cloud computing. Here, although cloud computing is exemplified, this is merely an example, and, for example, the medical service support device 20 may be implemented by a mainframe or implemented by network computing such as fog computing, edge computing, or grid computing.

The medical service support device 20 includes a support device server 74 and a management information storage device 76. The management information storage device 76 is connected to the support device server 74. The support device server 74 is connected to the endoscope part management device main body 68 via the network 22, performs a process in response to a request from the endoscope part management device main body 68, and provides a processing result to the endoscope part management device main body 68.

The endoscope part management device main body 68 anonymizes the endoscopy information 44 and transmits the anonymized endoscopy information 44 and washing information 66 to the support device server 74. The anonymization of the endoscopy information 44 means the anonymization of the subject specified based on the subject ID included in the endoscopy information 44.

The support device server 74 receives the endoscopy information 44 and the washing information 66, and stores the received endoscopy information 44 and the washing information 66 in the management information storage device 76. The support device server 74 selectively acquires the endoscopy information 44 and the washing information 66 from the management information storage device 76 as necessary, and executes a process by using the acquired information.

Figure 2:
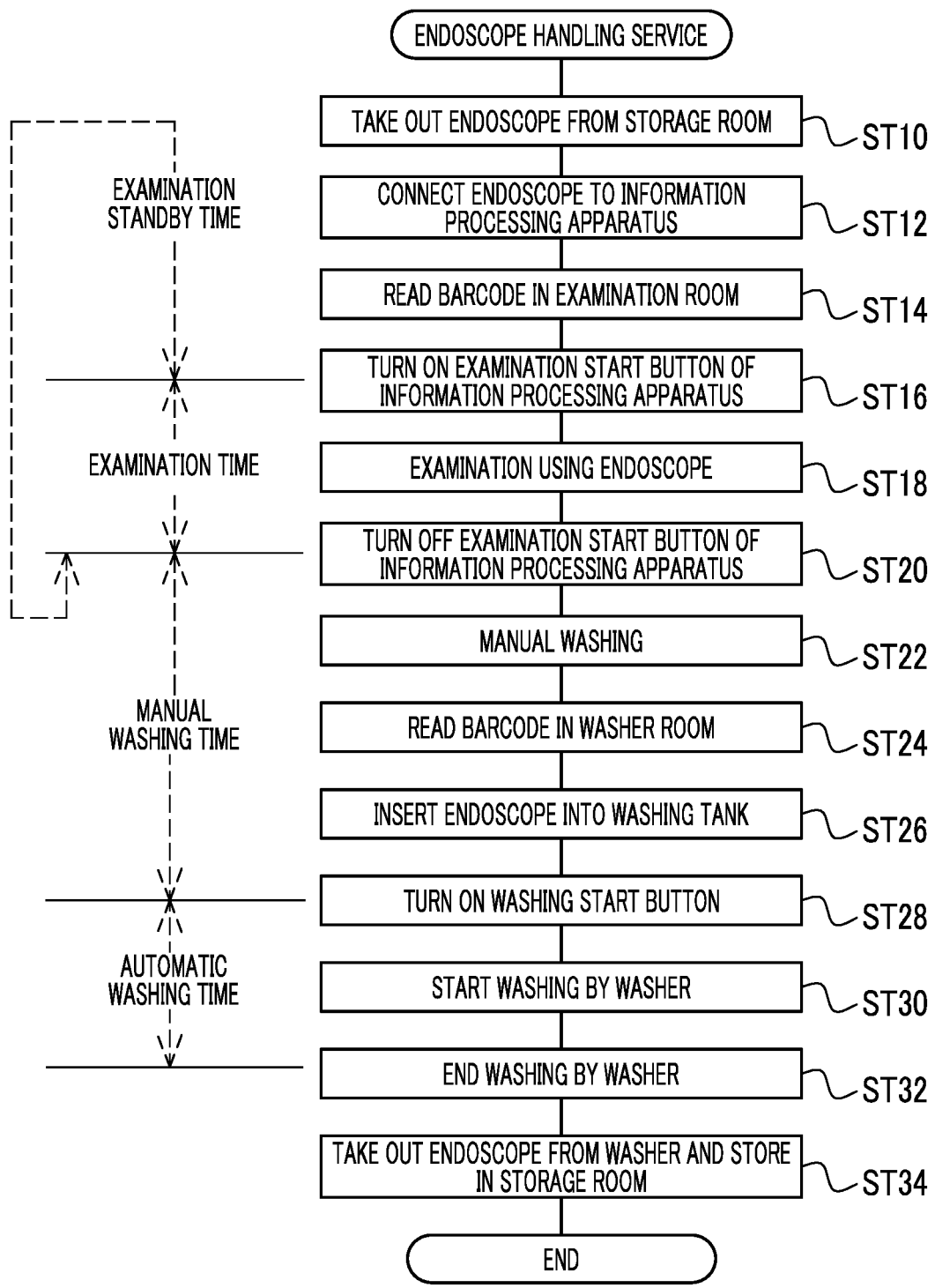
FIG. 2 is a flowchart showing an example of a flow of an endoscope handling service.

FIG. 2 shows an example of a flow of an endoscope handling service performed by the endoscopy worker. In the following, for convenience of explanation, the description is based on the premise that the usable endoscope 24 (for example, the endoscope 24 washed by the washer 52) is stored in a storage room (not shown) in a medical installation facility by the endoscopy worker.

In the endoscope handling service shown in FIG. 2, first, in step ST10, the endoscope 24 is taken out from the storage room by the endoscopy worker, and the endoscope 24 is transported into one examination room 30 among the plurality of examination rooms 30.

In the next step ST12, the endoscope 24 is connected to the information processing apparatus 36 in the examination room 30 via the light source device 31 and the endoscope processor device 32.

In the next step ST14, the barcode 42 of the endoscope 24 is read by the barcode reader 40 in the examination room 30. Accordingly, the endoscope ID of the endoscope 24 is acquired by the information processing apparatus 36.

In the next step ST16, the examination start button 38A of the information processing apparatus 36 is turned on. Further, an examination start button (not shown) is also provided in the endoscope processor device 32, and the examination start button of the endoscope processor device 32 is turned on. Accordingly, an endoscopy is started. Here, although an example of the embodiment has been described in which a process of step ST14 is performed prior to a process of step ST16, this is merely an example, and the process of step ST16 may be performed prior to the process of step ST14. That is, the order of step ST14 and step ST16 may be reversed.

In the following, for convenience of explanation, although the description is based on the premise that an endoscopy is started on a condition that the examination start button 38A is turned on, the present disclosed technology is not limited to this. For example, the endoscope processor device 32 may also include an examination start button similar to the examination start button 38A of the information processing apparatus 36, and the endoscopy may be started on a condition that the examination start button 38A of the information processing apparatus 36 is turned on and the examination start button of the endoscope processor device 32 is also turned on. In this case, the endoscope processor device 32 and the information processing apparatus 36 are examples of the "information processing apparatuses" according to the present disclosed technology.

In the next step ST18, an examination using the endoscope 24 (such as imaging of a test observation site by the imaging part 24B of the endoscope 24) is performed by a doctor or the like. Accordingly, the information processing apparatus 36 generates an image based on an imaging signal obtained by imaging by the imaging part 24B.

In the next step ST20, the examination start button 38A of the information processing apparatus 36 is turned off. Further, the examination start button of the endoscope processor device 32 is also turned off. Accordingly, the endoscopy is ended. The time during which the information processing apparatus 36 is being operated corresponds to time from when the examination start button 38A is turned on in step ST16 to when the examination start button 38A is turned off in step ST20, and is time (hereinafter, also referred to as "examination time") during which the endoscopy is being performed.

In the following, for convenience of explanation, although the description is based on the premise that the endoscopy is ended on a condition that the examination start button 38A is turned off, the present disclosed technology is not limited to this. For example, the endoscopy may end on a condition that the examination start button 38A of the information processing apparatus 36 is turned off and the examination start button of the endoscope processor device 32 is also turned off.

In the next step ST22, manual washing of the endoscope 24 used in step ST18 is performed. In the next step ST24, the barcode 42 of the endoscope 24 manually washed in the washer room 50 is read by the barcode reader 64. Accordingly, the endoscope ID of the endoscope 24 is acquired by the washer management device 54.

In the next step ST26, the endoscope 24 is inserted into the washing tank of the washer 52. In the next step ST28, the washing start button 60A is turned on.

Note that time from when the endoscopy is ended to when washing of the endoscope 24 by the washer 52 is started, that is, time from when the examination start button 38A is turned off in step ST20 to when the washing start button 60A is turned on in step ST28 is washing wait time to when washing of the endoscope 24 by the washer 52 is started. The washing wait time is also time during which manual washing is performed with respect to the endoscope 24. In the following, for convenience of explanation, the washing wait time, that is, the time during which manual washing is performed on the endoscope 24 is also referred to as "manual washing time".

In the next step ST30, washing of the endoscope 24, which is inserted into the washing tank in step ST26, is started by the washer 52. In the next step ST32, after a lapse of designated time after the washing start button 60A is turned on in step ST28, the washing of the endoscope 24, which is inserted into the washing tank in step ST26, by the washer 52 is ended, and one endoscope handling service is ended.

The time from when the washing start button 60A is turned on in step ST28 to when the washing of the endoscope 24 by the washer 52 is ended in step ST32 is time corresponding to time during which washing of the endoscope 24 is being performed by the washer 52 (hereinafter, also referred to as "automatic washing time").

In the next step ST34, the endoscope 24 is taken out from the washer 52, and the taken-out endoscope 24 is stored in the storage room.

In a case where N is a natural number, in a specific examination room 30, time required from immediately before a time when an N-th endoscopy is ended (immediately before a time when the examination start button 38A is turned off in step ST20 included in the N-th endoscope handling service) to immediately before a time when an (N+1)-th endoscopy is started (immediately before a time when the examination start button 38A is turned on in step ST16 included in the (N+1)-th endoscope handling service) is time corresponding to time during which the endoscopy is on standby in a specific examination room 30 (hereinafter, also referred to as "examination standby time").

Figure 3:
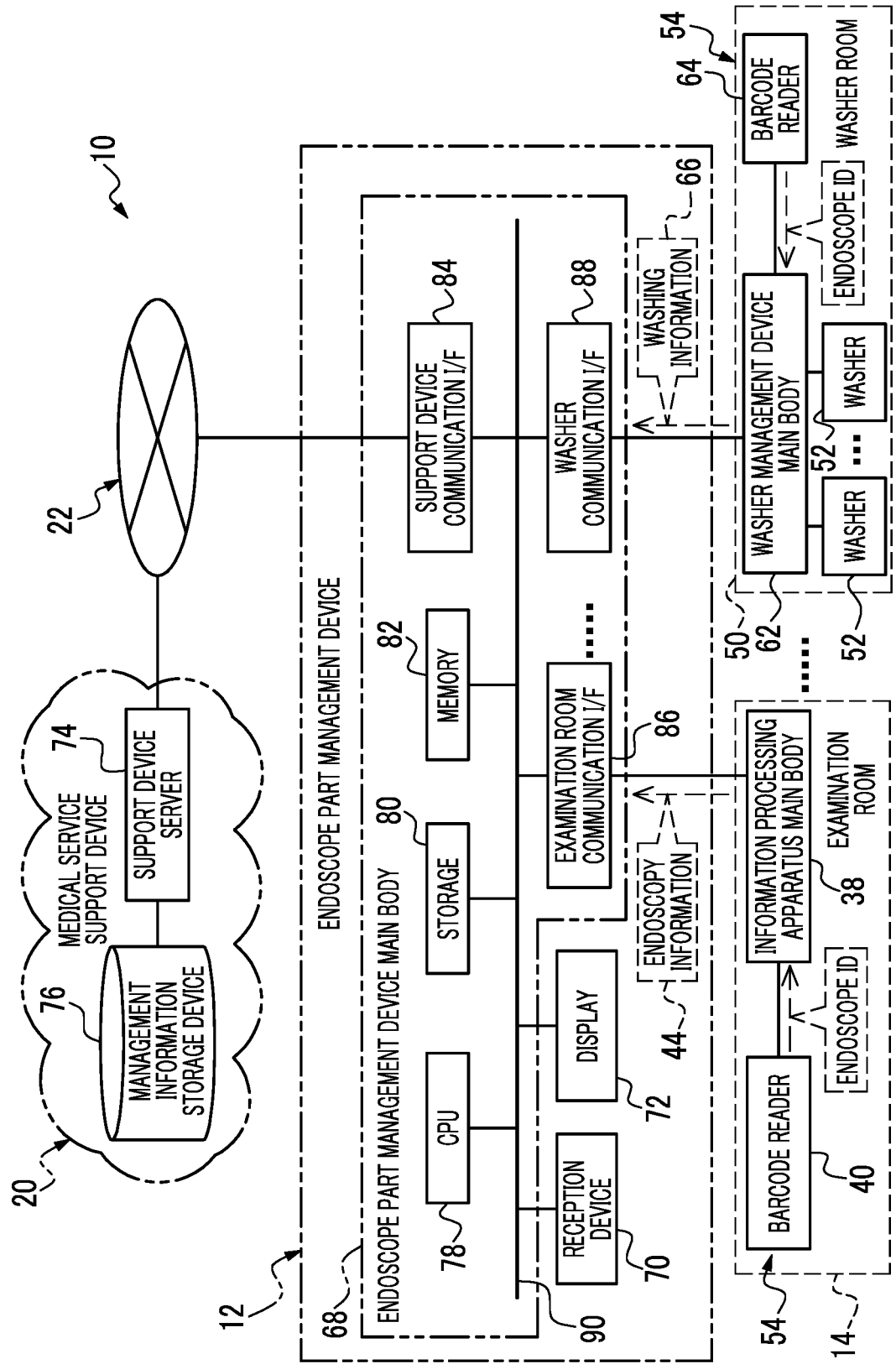
FIG. 3 is a block diagram showing an example of a hardware configuration of an electrical system of an endoscope part management device.

As an example, as shown in FIG. 3, the endoscope part management device main body 68 includes a CPU 78, a storage 80, a memory 82, a support device communication (interface) I/F 84, a plurality of examination room communication I/Fs 86, and a washer communication I/F 88. The CPU 78, the storage 80, the memory 82, the support device communication I/F 84, the plurality of examination room communication I/Fs 86, and the washer communication I/F 88 are connected to a bus 90.

The CPU 78 controls the entire endoscope part management device main body 68. The storage 80 is a non-volatile storage device that stores various programs, various parameters, and the like. Examples of the storage 80 include an EEPROM, an SSD, and/or an HDD. The memory 82 is a memory in which information is temporarily stored and is used as a work memory by the CPU 78. Examples of the memory 82 include a RAM.

The support device communication I/F 84 is connected to the network 22 and controls the exchange of information between the CPU 78 and the support device server 74. For example, the support device communication I/F 84 transmits information in response to a request from the CPU 78 to the support device server 74 via the network 22, receives the information transmitted from the support device server 74, and outputs the received information to the CPU 78.

The examination room communication I/F 86 is provided for each examination room 30 and is connected to the information processing apparatus main body 38 in the examination room 30. The examination room communication I/F 86 controls the exchange of information between the CPU 78 and the information processing apparatus main body 38. For example, the examination room communication I/F 86 transmits information in response to a request from the CPU 78 to the information processing apparatus main body 38 designated by the CPU 78 among the plurality of information processing apparatus main bodies 38. Further, the examination room communication I/F 86 acquires the endoscopy information 44 from the information processing apparatus main body 38 and outputs the acquired endoscopy information 44 to the CPU 78.

The washer communication I/F 88 is connected to a washer management device main body 62 and controls the exchange of information between the CPU 78 and the washer management device main body 62. For example, the washer communication I/F 88 transmits information in response to a request from the CPU 78 to the washer management device main body 62. Further, the washer communication I/F 88 acquires the washing information 66 from the washer management device main body 62 and outputs the acquired washing information 66 to the CPU 78.

Figure 4:
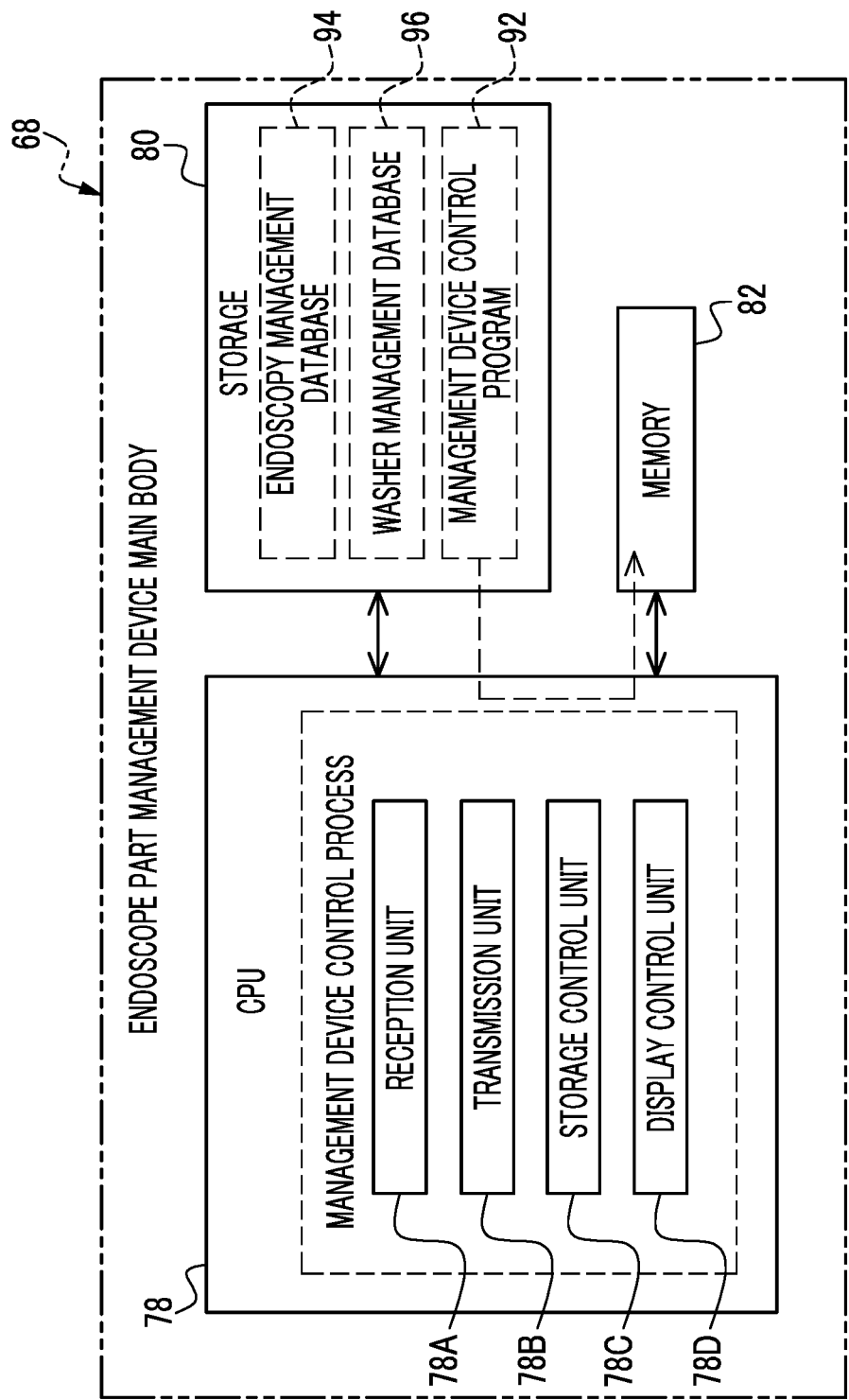
FIG. 4 is a block diagram showing an example of a function of a CPU and a storage content of a storage in an endoscope part management device main body.

As an example, as shown in FIG. 4, in the endoscope part management device main body 68, the storage 80 stores a management device control program 92. The CPU 78 reads the management device control program 92 from the storage 80 and performs a management device control process by executing the read management device control program 92 on the memory 82 (see FIG. 10). The management device control process is realized by the CPU 78 operating as a reception unit 78A, a transmission unit 78B, a storage control unit 78C, and a display control unit 78D in accordance with the management device control program 92. Specific processing contents of the reception unit 78A, the transmission unit 78B, the storage control unit 78C, and the display control unit 78D will be described later with reference to FIG. 10.

An endoscopy management database 94 and a washer management database 96 are constructed in the storage 80. The storage control unit 78C acquires the endoscopy information 44 (see FIG. 1 and FIG. 3) via the examination room communication I/F 86 (see FIG. 3) and stores the acquired endoscopy information 44 in the endoscopy management database 94. Further, the storage control unit 78C acquires the washing information 66 (see FIG. 1 and FIG. 3) via the washer communication I/F 88 (see FIG. 3) and stores the acquired washing information 66 in the washer management database 96. In the following, for convenience of explanation, in a case where it is not necessary to distinguish between the endoscopy management database 94 and the washer management database 96, a term "medical installation facility side management database" will also be used.

Figure 5:
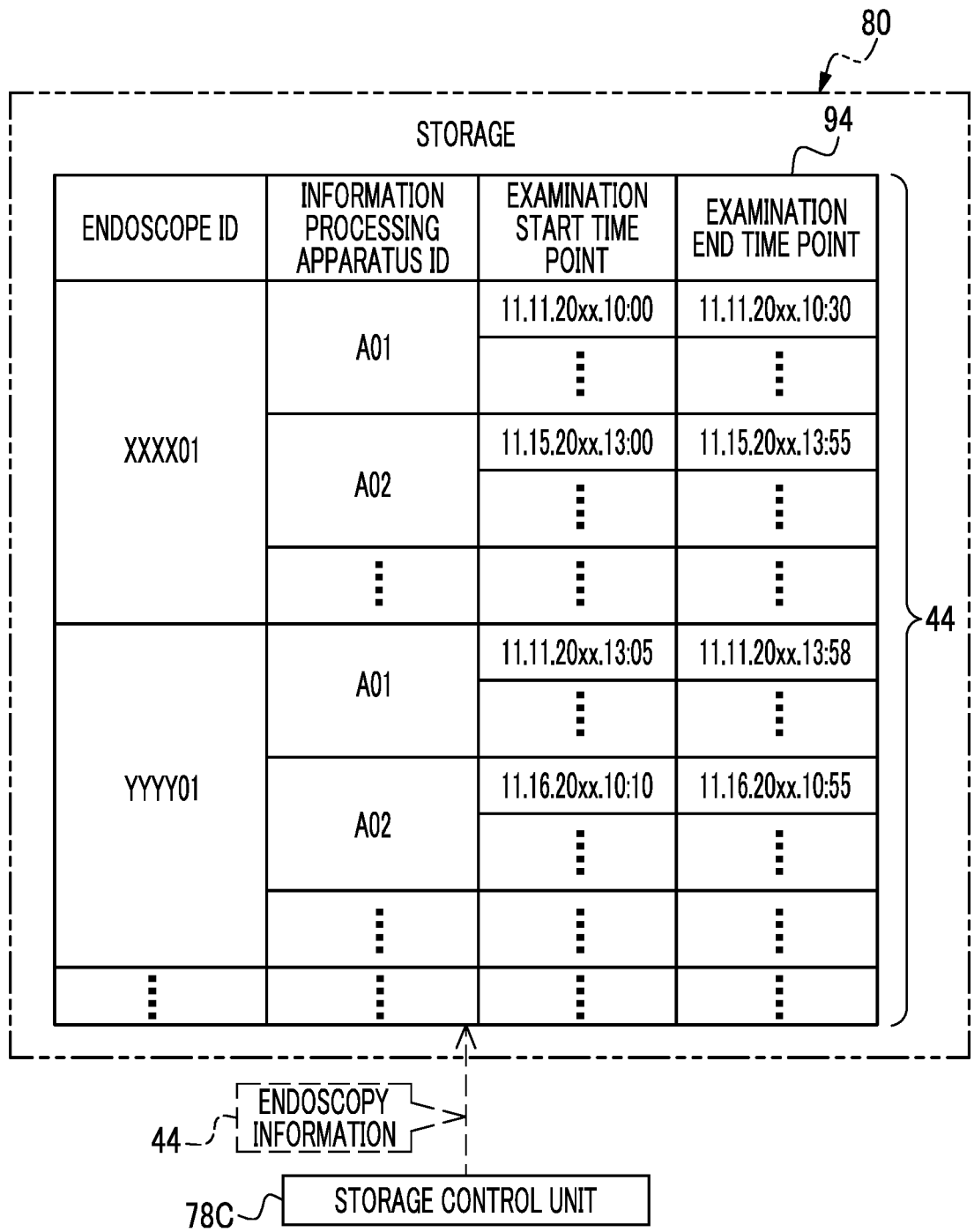
FIG. 5 is a conceptual diagram showing an example of a content of an endoscopy management database.

As an example, as shown in FIG. 5, in the endoscopy management database 94, the endoscopy information 44 acquired by the storage control unit 78C from each information processing apparatus main body 38 installed in each of the plurality of examination rooms 30 is stored. In the endoscopy management database 94, the examination start time point and the examination end time point are associated for each endoscope ID and for each information processing apparatus ID. Further, the subject ID is associated with the examination start time point or the examination end time point (not shown).

Figure 6:
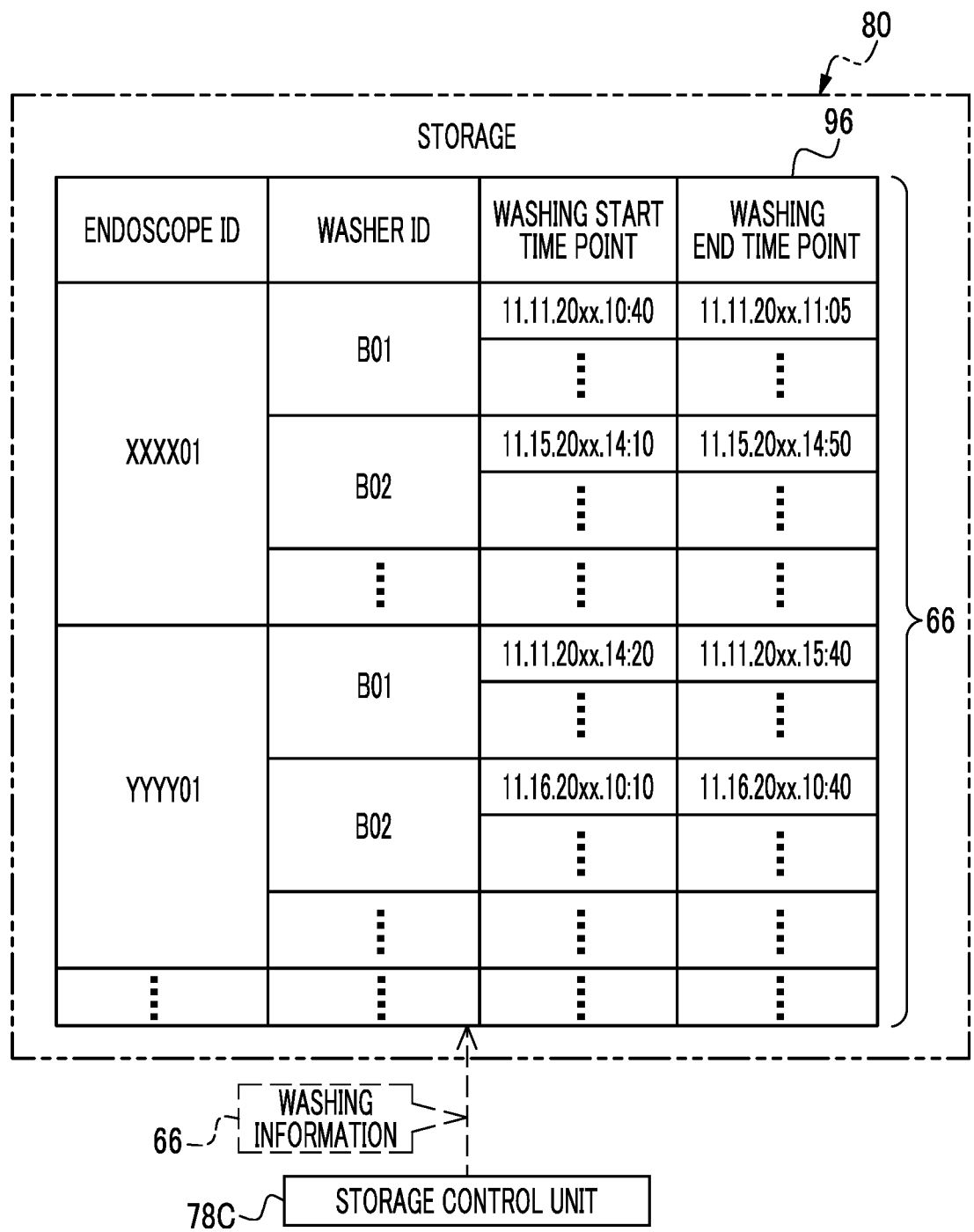
FIG. 6 is a conceptual diagram showing an example of a content of a washer management database.

As an example, as shown in FIG. 6, in the washer management database 96, the washing information 66 acquired by the storage control unit 78C from the washer management device main body 62 is stored. In the washer management database 96, the washing start time point and the washing end time point are associated for each endoscope ID and for each washer ID.

Figure 7:
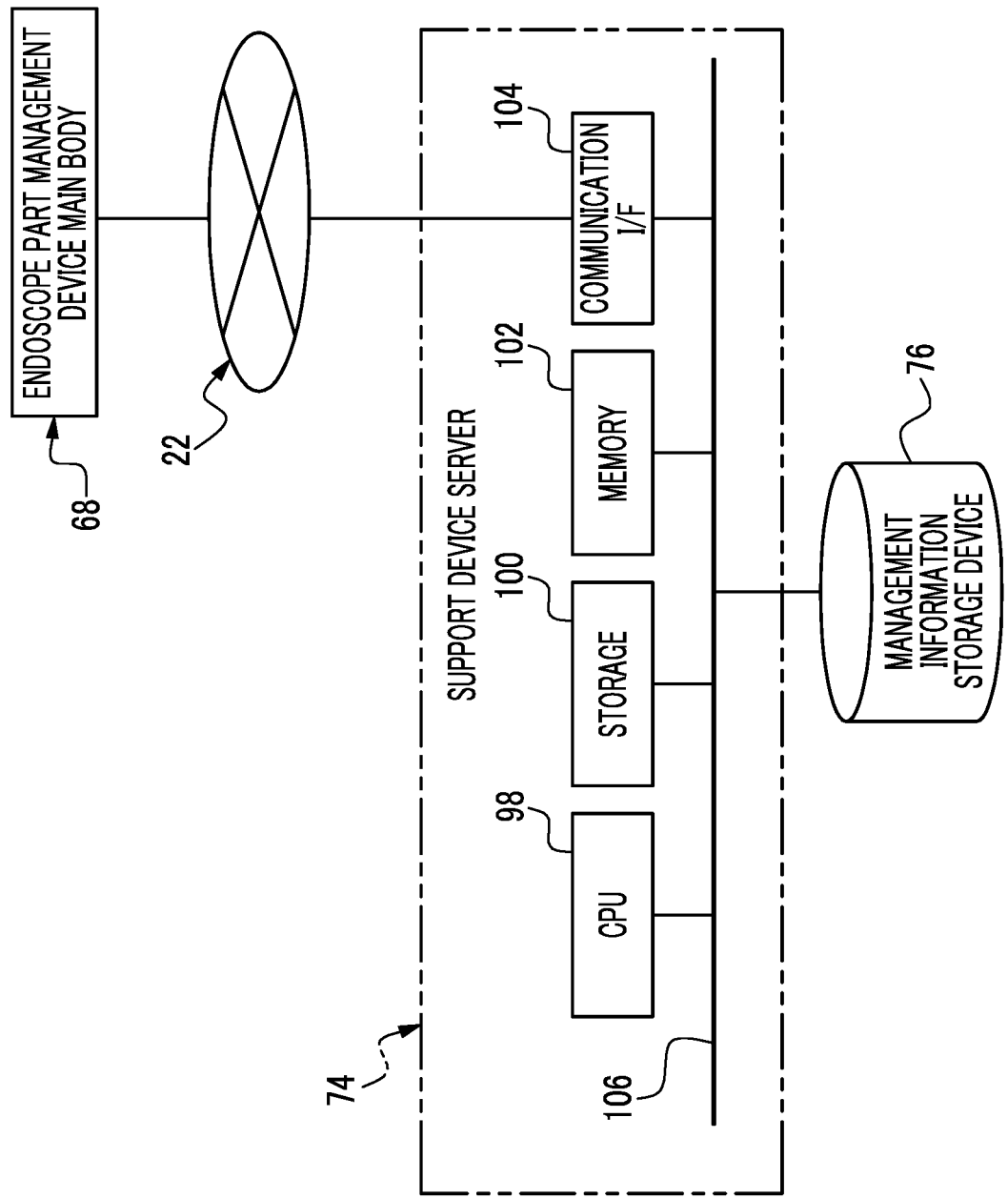
FIG. 7 is a block diagram showing an example of a hardware configuration of an electrical system of a support device server.

As an example, as shown in FIG. 7, the support device server 74 includes a CPU 98, a storage 100, a memory 102, and a communication I/F 104. The CPU 98 is an example of a "processor" according to the present disclosed technology, and the memory 102 is an example of a "memory" according to the present disclosed technology.

The CPU 98, the storage 100, the memory 102, and the communication I/F 104 are connected to a bus 106. Further, the management information storage device 76 is connected to the bus 106. Examples of the management information storage device 76 include an EEPROM, an SSD, and/or an HDD. In the management information storage device 76, anonymized management target information is stored.

The CPU 98 controls the entire support device server 74. The storage 100 is a non-volatile storage device that stores various programs, various parameters, and the like. Examples of the storage 100 include an EEPROM, an SSD, and/or an HDD. The memory 102 is a memory in which information is temporarily stored and is used as a work memory by the CPU 98. Examples of the memory 102 include a RAM.

The communication I/F 104 is connected to the endoscope part management device main body 68 via the network 22 and controls the exchange of information between the CPU 98 and the endoscope part management device main body 68. For example, the communication I/F 104 receives the information transmitted from the endoscope part management device main body 68 and outputs the received information to the CPU 78. Further, the communication I/F 104 transmits information in response to a request from the CPU 98 to the endoscope part management device main body 68 via the network 22.

Figure 8:
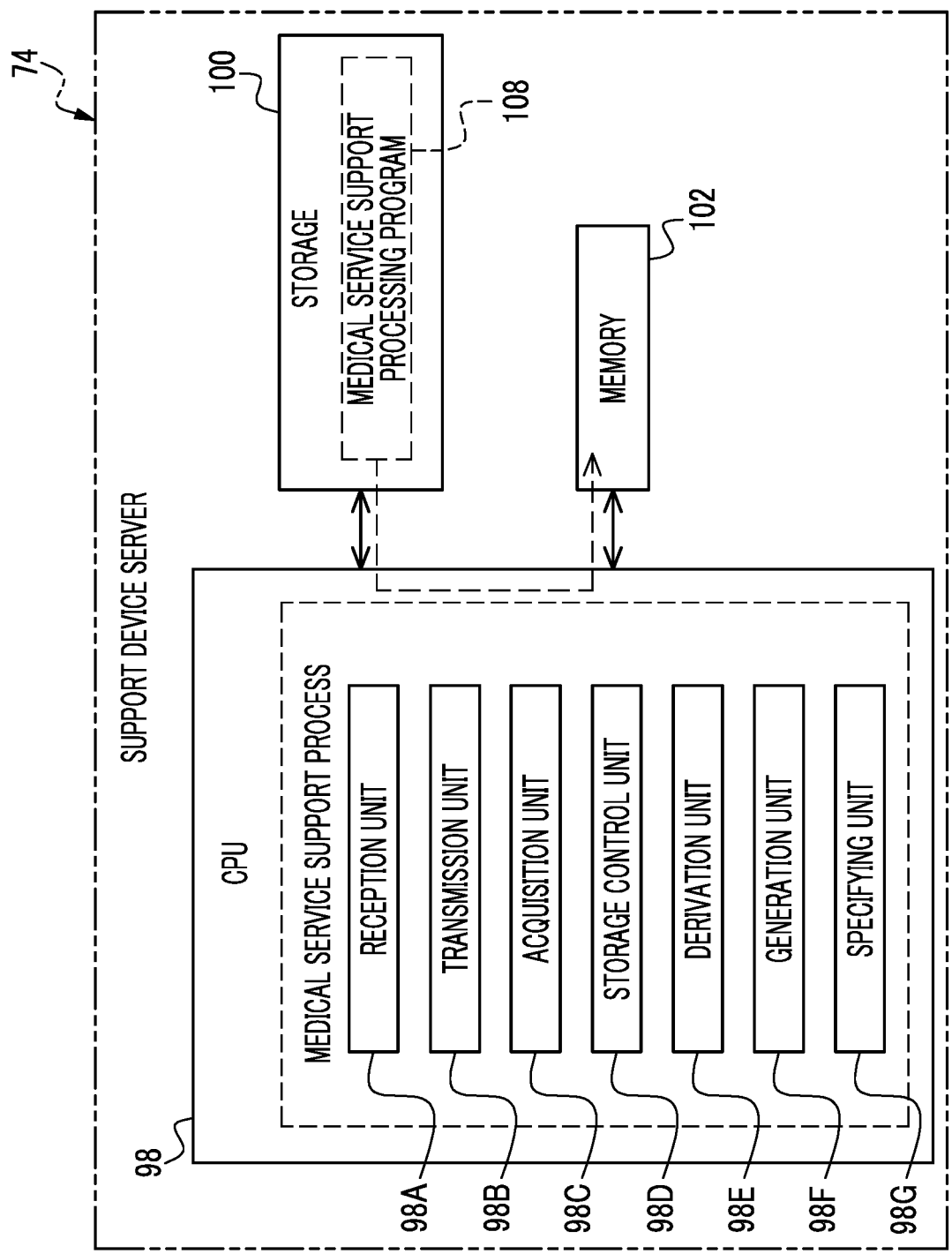
FIG. 8 is a block diagram showing an example of a function of a CPU and a storage content of a storage in the support device server.

As an example, as shown in FIG. 8, in the support device server 74, the storage 100 stores a medical service support processing program 108. The support device server 74 is an example of a "computer" according to the present disclosed technology, and the medical service support processing program 108 is an example of a "program" according to the present disclosed technology.

The CPU 98 reads the medical service support processing program 108 from the storage 100 and performs a medical service support process by executing the read medical service support processing program 108 on the memory 102 (see FIG. 11A to FIG. 11E). The medical service support process is realized by the CPU 98 operating as a reception unit 98A, a transmission unit 98B, an acquisition unit 98C, a storage control unit 98D, a derivation unit 98E, a generation unit 98F, a specifying unit 98G in accordance with the medical service support processing program 108. Specific processing contents of the reception unit 98A, the transmission unit 98B, the acquisition unit 98C, the storage control unit 98D, the derivation unit 98E, the generation unit 98F, the specifying unit 98G will be described later with reference to FIG. 11A to FIG. 11E.

By performing the medical service support process, the CPU 98 acquires low operation rate information processing apparatus specification information capable of specifying a low operation rate information processing apparatus, which is the information processing apparatus 36 of which a standard operation degree falls below a threshold value among the plurality of information processing apparatuses 36 used in an endoscopy, and outputs the medical service support information obtained based on the low operation rate information processing apparatus specification information. In the present first embodiment, the medical service support information includes screen information showing a medical service support screen 114 (see FIG. 12). Here, the low operation rate information processing apparatus is an example of the "low operation rate medical device" according to the present disclosed technology, and the low operation rate information processing apparatus specification information is an example of the "low operation rate medical device specification information" according to the present disclosed technology.

As described in detail later, the CPU 98 acquires the low operation rate information processing apparatus specification information for a time period when an overall operation degree of the plurality of information processing apparatuses 36 is equal to or higher than a reference degree, and outputs the medical service support information obtained based on the acquired low operation rate information processing apparatus specification information. Here, the time period when the overall operation degree of the plurality of information processing apparatuses 36 is equal to or higher than the reference degree indicates a time period when a value based on the number of endoscopies is equal to or greater than a first reference value. Further, the standard operation degree is a value based on operation time of the information processing apparatus 36 in the time period when the overall operation degree is equal to or higher than the reference degree. Examples of the standard operation degree include an operation rate of the information processing apparatus 36. Further, the standard operation degree is not limited to the operation rate of the information processing apparatus 36 and may be the operation time of the information processing apparatus 36 itself. The operation degree of the medical device indicates information that indicates a ratio of operation of the medical device that can be acquired by the medical service support device and is indicated by, for example, a value based on the number of endoscopies. The value based on the number of endoscopies indicates, for example, the number of endoscopies for each predetermined period such as for each day or for each hour. Further, in a case where an operation degree of the medical device is defined as a value based on the number of endoscopies, the overall operation degree indicates a total number of endoscopies executed by a plurality of medical devices for each predetermined period in a case where there are a plurality of medical devices that can be acquired by the medical service support device. The value based on the number of endoscopies may be obtained from the information of the examination start time point and the examination end time point of each endoscopy with reference to the endoscopy management database. The reference degree is a first reference value. More specifically, it is the first reference value for determining a period during which endoscopy is intensively performed, such as the peak operation date or the peak operation time. The first reference value may be a fixed value set in advance, or a variable value changed according to a user input. Further, the first reference value may be a variation value calculated based on the number of endoscopies performed in the past. The first reference value may be, for example, an average value of the number of endoscopies performed in the past or may be the maximum value of the number of endoscopies performed in the past or a value obtained by adding or multiplying the maximum value by a predetermined value. Further, in a case where the operation degree of the medical device indicates the number of endoscopies for each first period (for example, one day), the highest value, which is within the number of endoscopies for each first period in a second period (for example, one week) longer than the first period, may be defined as the first reference value. Further, in a case where the operation degree of the medical device is defined as a value based on the number of endoscopies, the standard operation degree may be a value based on the number of endoscopies for each medical device for a specific period when the total number of endoscopies executed by the plurality of medical devices for each predetermined period is equal to or greater than the first reference value.

Figure 9:
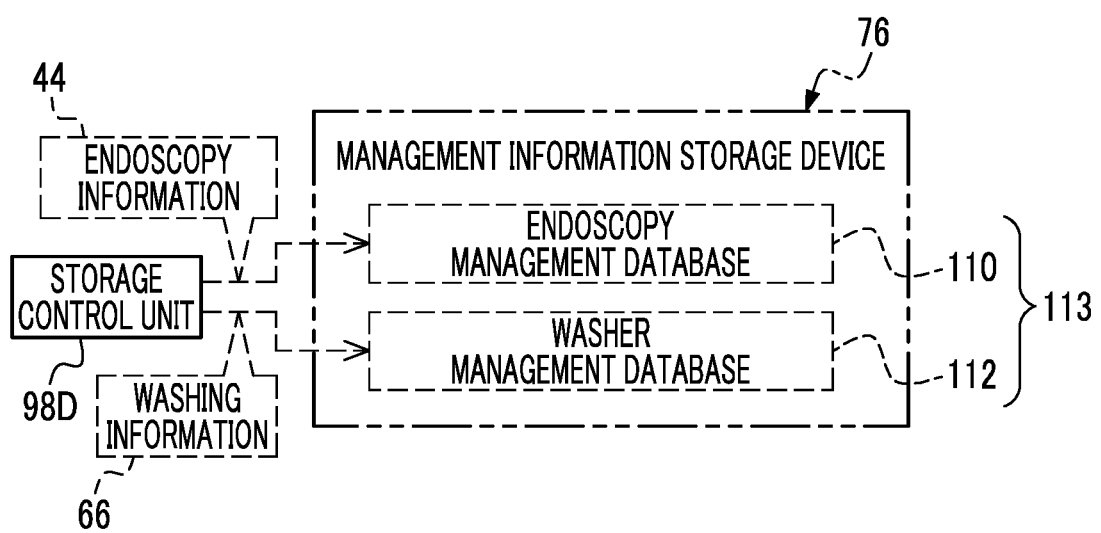
FIG. 9 is a block diagram showing an example of a storage content of a management information storage device.

As an example, as shown in FIG. 9, a support device management database 113 is constructed in the management information storage device 76. The support device management database 113 includes an endoscopy management database 110 and a washer management database 112. The anonymized endoscopy information 44 is stored in the endoscopy management database 110, and the washing information 66 is stored in the washer management database 112.

The storage control unit 98D acquires the anonymized endoscopy information 44 from the endoscope part management device main body 68 via the communication I/F 104 (see FIG. 7) and stores the acquired endoscopy information 44 in the endoscopy management database 110. The storage control unit 98D acquires the washing information 66 (see FIG. 6) from the endoscope part management device main body 68 via the communication I/F 104 (see FIG. 7)

and stores the acquired washing information 66 in the washer management database 112.

Next, the operation of the medical service support system will be described.

Figure 10:
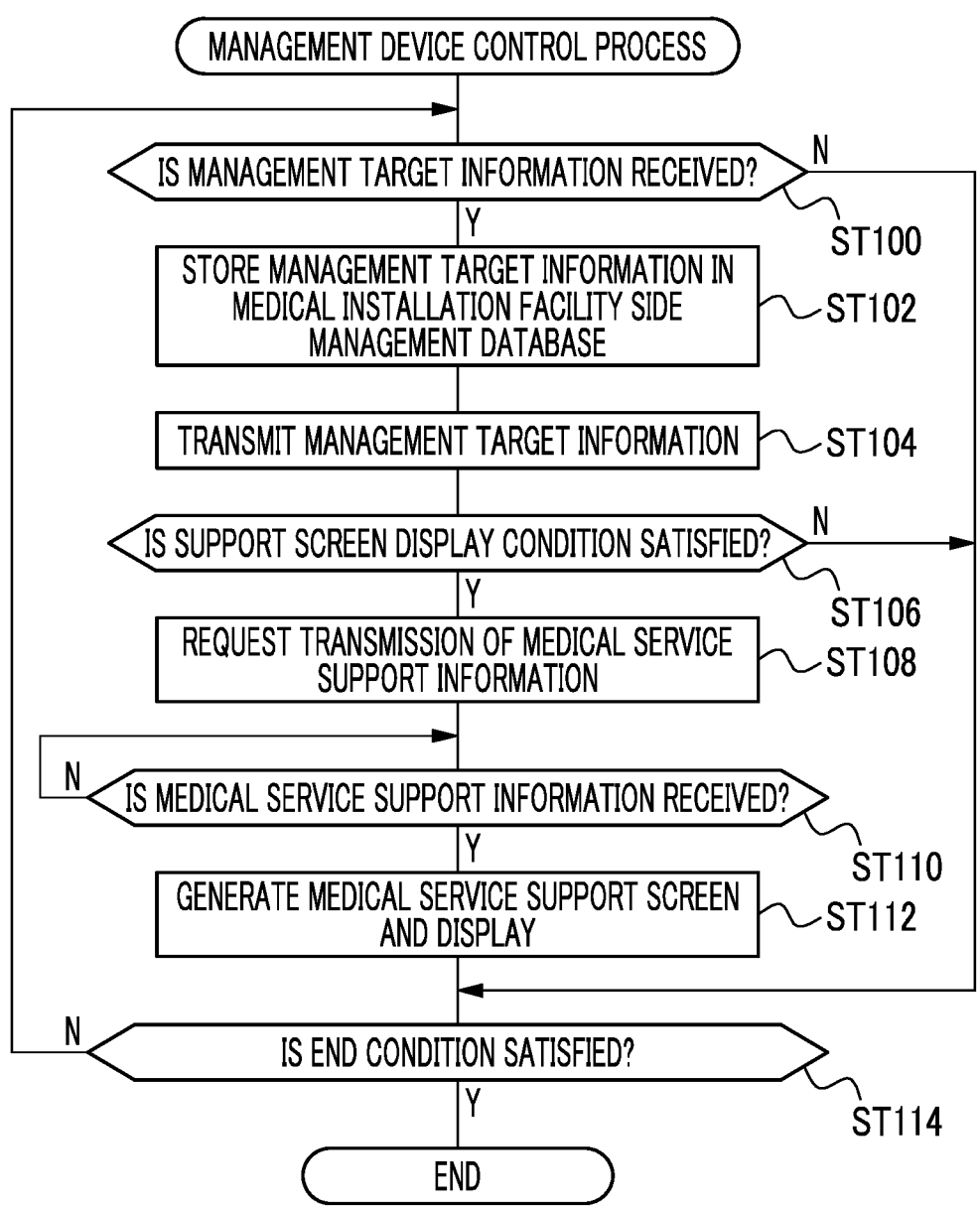
FIG. 10 is a flowchart showing an example of a flow of a management device control process.

FIG. 10 shows an example of a flow of a management device control process performed by the CPU 78 of the endoscope part management device 12. In the present first embodiment, the information processing apparatus 36 will be described below as an example of the medical device.

In the management device control process shown in FIG. 10, first, in step ST100, the reception unit 78A determines whether or not the management target information is received through the examination room communication I/F 86 (see FIG. 3) or the washer communication I/F 88 (see FIG. 3). In step ST100, in a case in which the management target information is not received through the examination room communication I/F 86 or the washer communication I/F 88, a negative determination is made, and the management device control process proceeds to step ST114. In step ST100, in a case in which the management target information is received through the examination room communication I/F 86 or the washer communication I/F 88, a positive determination is made, and the management device control process proceeds to step ST102.

In step ST102, the storage control unit 78C stores the management target information, which is received through the examination room communication I/F 86 or the washer communication I/F 88 in step ST100, in the medical installation facility side management database. That is, the endoscopy information 44 is stored in the endoscopy management database 94 (see FIGS. 4 and 5), and the washing information 66 is stored in the washer management database 96 (see FIGS. 4 and 6). After the process in step ST102 is executed, the management device control process proceeds to step ST104.

In step ST104, the transmission unit 78B transmits the management target information, which is received in step ST100, to the support device server 74 via the support device communication I/F 84 (see FIG. 3). After the process in step ST104 is executed, the management device control process proceeds to step ST106.

In step ST106, the transmission unit 78B determines whether or not a support screen display condition, which is a condition for displaying the medical service support screen 114 (see FIG. 12) on the display 72 (see FIG. 1 and FIG. 3), is satisfied. A first example of the support screen display condition includes a condition that the reception device 70 (see FIGS. 1 and 3) receives an instruction for displaying the medical service support screen 114 on the display 72. Further, a second example of the support screen display condition includes a condition that a time point (for example, 22:00), which is designated in advance, has arrived. Further, the second example of the support screen display condition includes a condition that an amount of information of the management target information stored in the medical installation facility side management database reaches a default amount of information.

In step ST106, in a case where the support screen display condition is not satisfied, a negative determination is made, and the management device control process proceeds to step ST114. In step ST106, in a case where the support screen display condition is satisfied, a positive determination is made, and the management device control process proceeds to step ST108.

In step ST108, the transmission unit 78B requests transmission of the medical service support information from the support device server 74 via the support device communication I/F 84 (see FIG. 3). After the process in step ST108 is executed, the management device control process proceeds to step ST110.

In a case where the process of step ST108 is executed, the processes of step ST206 to step ST216, which are included in the medical service support process shown in FIG. 11A to FIG. 11E, are executed by the support device server 74, and the medical service support information is transmitted from the support device server 74 to the endoscope part management device 12 via the network 22 by executing step ST254.

In step ST110, the reception unit 78A determines whether or not the medical service support information, which is transmitted from the support device server 74, is received through the support device communication I/F 84 (see FIG. 3). In step ST110, in a case where the medical service support information is not received through the support device communication I/F 84, a negative determination is made, and the determination in step ST110 is performed again. In step ST110, in a case in which the medical service support information is received through the support device communication I/F 84, a positive determination is made, and the management device control process proceeds to step ST112.

In step ST112, the display control unit 78D generates the medical service support screen 114 (see FIG. 12) by using the medical service support information received through the support device communication I/F 84 in step ST110 and displays the medical service support screen 114 (see FIG. 12) on the display 72 (see FIG. 1 and FIG. 3). After the process in step ST112 is executed, the management device control process proceeds to step ST114.

In step ST114, the display control unit 78D determines whether or not a condition for ending the management device control process (hereinafter, referred to as a "management device control process end condition") is satisfied. Examples of the management device control process end condition include a condition that an instruction for ending the management device control process is received by the reception device 70 (see FIG. 1 and FIG. 3).

In step ST114, in a case where the management device control process end condition is not satisfied, a negative determination is made, and the management device control process proceeds to step ST100. In step ST114, in a case where the management device control process end condition is satisfied, the management device control process is ended.

FIG. 11A to FIG. 11E show an example of a flow of the medical service support process performed by the CPU 98 of the support device server 74.

Figure 11A:
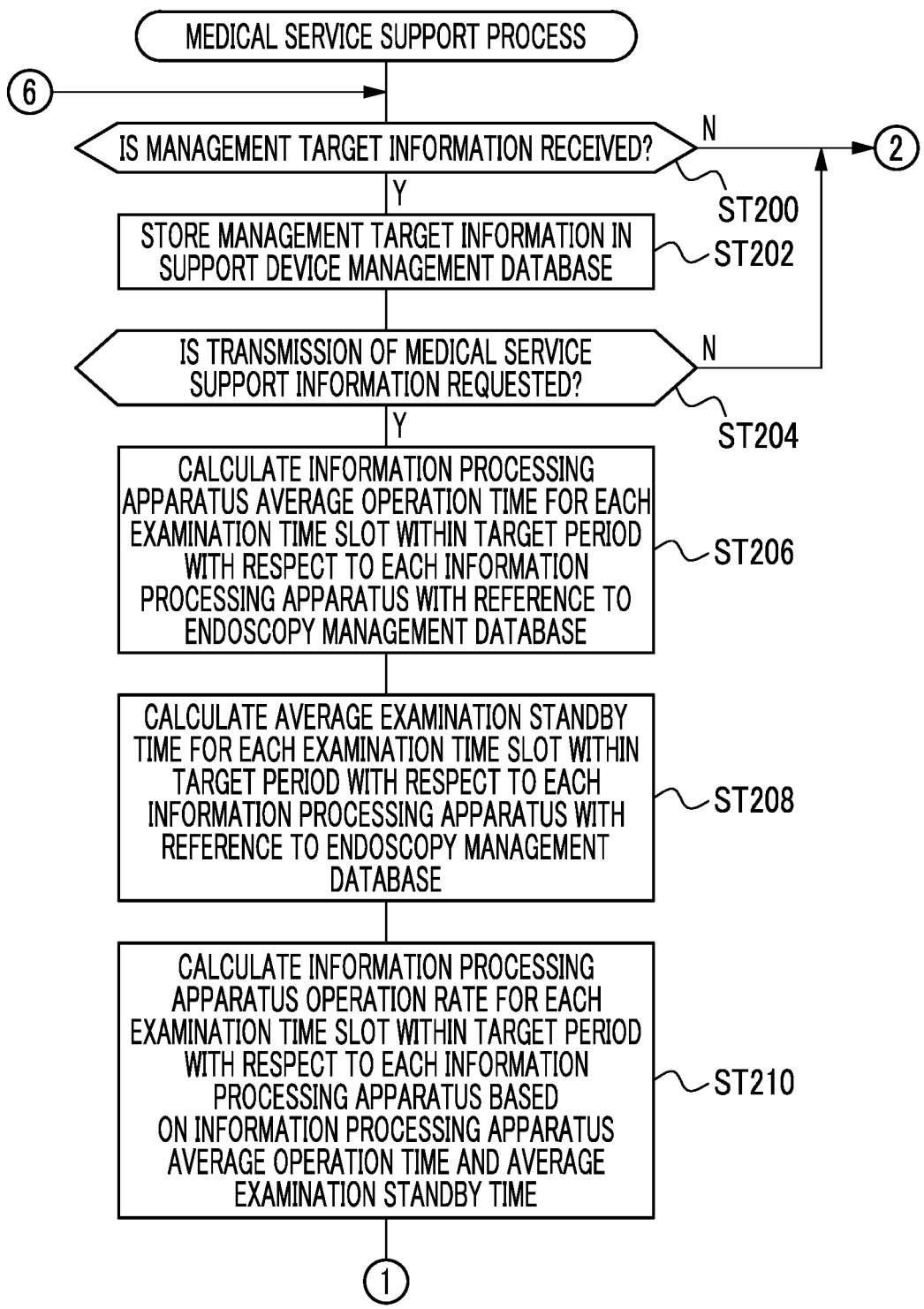
FIG. 11A is a flowchart showing an example of a flow of a medical service support process according to a first embodiment.

In the medical service support process shown in FIG. 11A, first, in step ST200, the reception unit 98A determines whether or not the management target information, which is transmitted by executing the process of step ST100 included in the management device control process shown in FIG. 10, is received through the communication I/F 104 (see FIG. 7). In step ST200, in a case where the management target information is not received through the communication I/F 104, a negative determination is made, and the medical service support process proceeds to step ST256 shown in FIG. 11E. In step ST200, in a case where the management target information is received through the communication I/F 104, a positive determination is made, and the medical service support process proceeds to step ST202.

In step ST202, the storage control unit 98D stores the management target information, which is received through the communication I/F 104 in step ST200, in the support device management database 113. That is, the endoscopy information 44 is stored in the endoscopy management database 110 (see FIG. 9), and the washing information 66 is stored in the washer management database 112 (see FIG. 9). After the process in step ST202 is executed, the medical service support process proceeds to step ST204.

In step ST204, the reception unit 98A determines whether or not transmission of the medical service support information is requested from the endoscope part management device 12 by executing the process of step ST108 included in the management device control process shown in FIG. 10. In step ST204, in a case where the transmission of the medical service support information is not requested from the endoscope part management device 12, a negative determination is made, and the medical service support process proceeds to step ST256 shown in FIG. 11E. In step ST204, in a case where the transmission of the medical service support information is requested from the endoscope part management device 12, a positive determination is made, and the medical service support process proceeds to step ST206.

In step ST206, the derivation unit 98E calculates information processing apparatus average operation time for each examination time slot within a target period with respect to each of all the information processing apparatuses 36 (hereinafter, also referred to as "all the information processing apparatuses 36") installed in all the examination rooms 30, with reference to the endoscopy management database 110 (see FIG. 9). After the process in step ST206 is executed, the medical service support process proceeds to step ST208.

In the present first embodiment, the target period refers to, for example, a period determined according to an instruction received by the reception device 70 (see FIG. 1 and FIG. 3). Hereinafter, for convenience of explanation, a period from February 20XX to May 20XX will be described as an example as the target period.

In the present first embodiment, the examination time slot is a time slot in which an endoscopy is performed and refers to a time slot from 8:00 to 16:00 in units of one hour. The time slot from 8:00 to 16:00 in units of one hour is merely an example, and may be, for example, a time slot of several minutes to several hours within the time of outpatient treatment at a medical installation facility. The examination time slot may be a fixed value or a variable value that is changed according to an instruction received by the reception device 70 or the like.

In the present first embodiment, the information processing apparatus average operation time refers to an average value of the operation time of all the information processing apparatuses 36. The operation time of the information processing apparatus 36 is specified based on the examination start time point and the examination end time point of the endoscopy information 44 stored in the endoscopy management database 110. The operation time of the information processing apparatus 36 is time corresponding to the examination time shown in FIG. 2 and is specified based on the examination start time point and the examination end time point of the endoscopy information 44 stored in the endoscopy management database 110. The information processing apparatus average operation time corresponds to an average value of the examination time (see FIG. 2) of all the endoscopies performed in all the examination rooms 30 within the target period.

Here, although the information processing apparatus average operation time is exemplified as the information processing apparatus standard operation time, this is merely an example, and it may be a statistical value such as a median value, the most frequent value, the maximum value, the minimum value, or a percentile of the operation time of all the information processing apparatuses 36. Further, the information processing apparatus average operation time may be calculated within a time range (for example, within a range of substantially 1 minute to 50 minutes) predetermined with an upper limit value and a lower limit value.

In step ST208, the derivation unit 98E calculates average examination standby time for each examination time slot within the target period with respect to each of all the information processing apparatuses 36, with reference to the endoscopy management database 110 (see FIG. 9). After the process in step ST208 is executed, the medical service support process proceeds to step ST210.

In the present step ST208, the average examination standby time is an average value of the examination standby time of each information processing apparatus 36 for each examination time slot within the target period, in other words, an average value of the examination standby time of each examination room 30 for each examination time slot within the target period.

In step ST210, the derivation unit 98E calculates the information processing apparatus operation rate for each examination time slot within the target period with respect to each of all the information processing apparatuses 36, based on the information processing apparatus average operation time calculated in step ST206 and on the average examination standby time calculated in step ST208. After the processing in step ST210 is executed, the medical service support process proceeds to step ST212 shown in FIG. 11B.

In the present step ST210, the information processing apparatus operation rate refers to the operation rate of the information processing apparatus 36. The operation rate of the information processing apparatus 36 is calculated by the derivation unit 98E according to the expression "(information processing apparatus average operation time)/{(information processing apparatus average operation time)+(average examination standby time)}" for each examination time slot within the target period.

In step ST212 shown in FIG. 11B, the generation unit 98F determines whether or not the information processing apparatus 36 of which the information processing apparatus operation rate calculated in step ST210 falls below a first threshold value (for example, 5%) in the morning within the target period is present. Here, the first threshold value may be a constant operation rate predetermined as a standard operation rate of the information processing apparatus 36 that operates in the morning, or may be a variable value that is changed according to an instruction or the like given by the user or the like.

In the present step ST212, in a case where the information processing apparatus 36 of which the information processing apparatus operation rate calculated in step ST210 falls below the first threshold value in the morning within the target period is not present, a negative determination is made, and the medical service support process proceeds to step ST218. In the present step ST212, in a case where the information processing apparatus 36 of which the information processing apparatus operation rate calculated in step ST210 falls below the first threshold value in the morning within the target period is present, a positive determination is made, and the medical service support process proceeds to step ST214.

In step ST214, the generation unit 98F generates morning low operation rate apparatus specification information that specifies the information processing apparatus 36 of which the information processing apparatus operation rate falls below the first threshold value in the morning within the target period. The morning low operation rate apparatus specification information is, for example, information including an information processing apparatus ID related to the information processing apparatus 36 of which the information processing apparatus operation rate falls below the first threshold value in the morning within the target period. After the process in step ST214 is executed, the medical service support process proceeds to step ST216. The information processing apparatus 36 (for example, the information processing apparatus 36 specified based on the information processing apparatus ID included in the morning low operation rate apparatus specification information) which is specified based on the morning low operation rate apparatus specification information is an example of the "low operation rate medical device" according to the present disclosed technology.

In step ST216, the generation unit 98F generates first notification information based on the morning low operation rate apparatus specification information generated in step ST214. After the process in step ST216 is executed, the medical service support process proceeds to step ST218.

In the present step ST216, the first notification information is information that includes information for notifying of the information processing apparatus 36 that is specified based on the morning low operation rate apparatus specification information. Further, the first notification information is also information including the information processing apparatus operation rate (see step ST210 in FIG. 11A) of the information processing apparatus 36 specified based on the morning low operation rate apparatus specification information.

Here, the first notification information is an example of the "information for notifying of the low operation rate medical device related information related to the low operation rate medical device specified based on the low operation rate medical device specification information" according to the present disclosed technology. Further, the information processing apparatus operation rate included in the first notification information is an example of the "low operation rate medical device related information related to the low operation rate medical device specified based on the low operation rate medical device specification information" and the "information based on the operation rate of the low operation rate medical device" according to the present disclosed technology.

Figure 12:
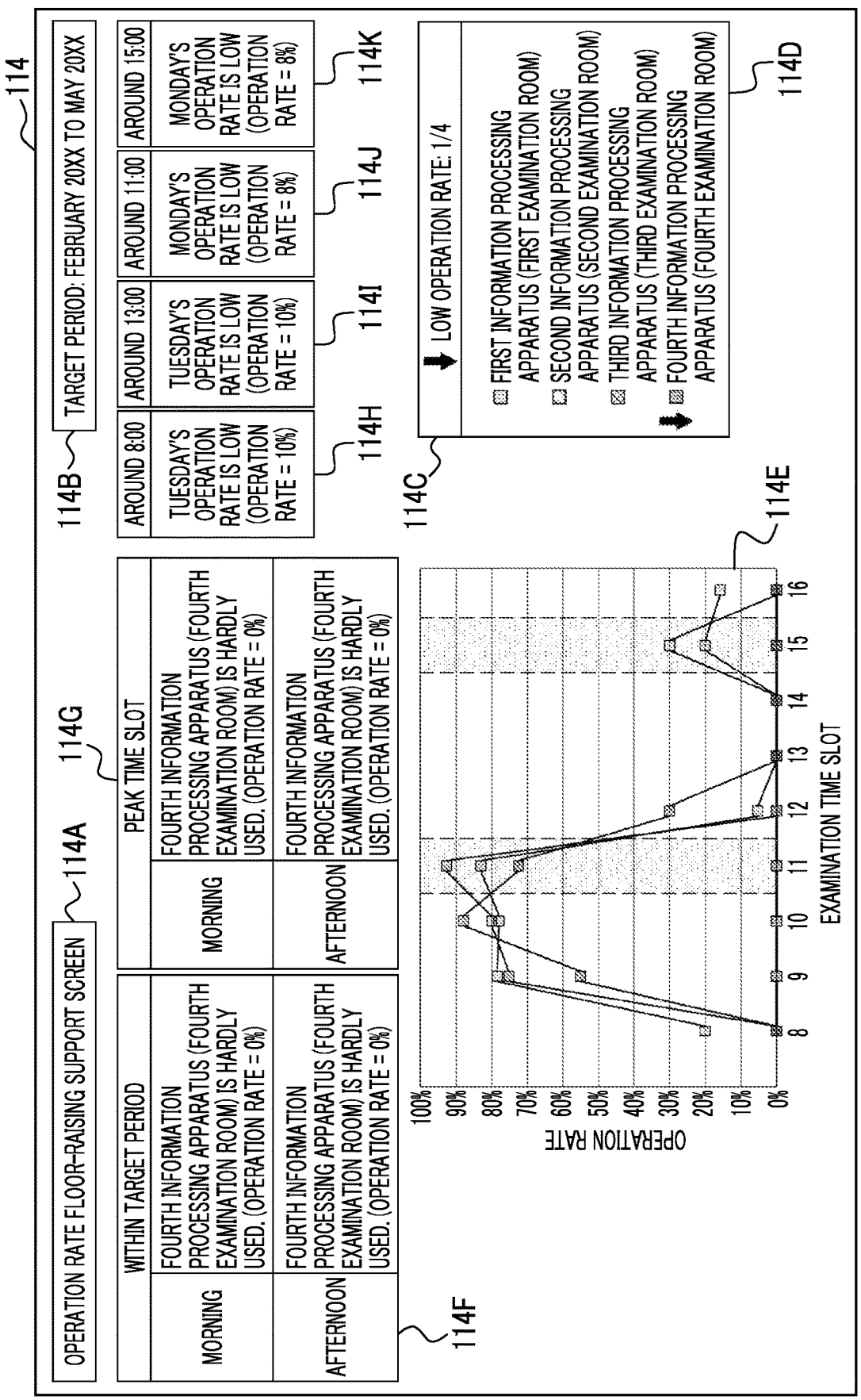
FIG. 12 is a screen view showing an example of a medical service support screen according to the first embodiment.

Further, examples of a notification method using the first notification information include a method of visualizing and notifying of various types of information through the medical service support screen 114 (see FIG. 12).

In step ST218, the generation unit 98F determines whether or not the information processing apparatus 36 of which the information processing apparatus operation rate calculated in step ST210 falls below a second threshold value (for example, 5%) in the afternoon within the target period is present. Here, the second threshold value may be a constant operation rate predetermined as a standard operation rate of the information processing apparatus 36 that operates in the afternoon, or may be a variable value that is changed according to an instruction or the like given by the user or the like. Here, as the second threshold value, the same value as that of the first threshold value is applied.

In the present step ST218, in a case where the information processing apparatus 36 of which the information processing apparatus operation rate calculated in step ST210 falls below the second threshold value in the afternoon within the target period is not present, a negative determination is made, and the medical service support process proceeds to step ST224 shown in FIG. 11C. In the present step ST218, in a case where the information processing apparatus 36 of which the information processing apparatus operation rate calculated in step ST210 falls below the second threshold value in the afternoon within the target period is present, a positive determination is made, and the medical service support process proceeds to step ST220.

In step ST220, the generation unit 98F generates afternoon low operation rate apparatus specification information that specifies the information processing apparatus 36 of which the information processing apparatus operation rate falls below the second threshold value in the afternoon within the target period. The afternoon low operation rate apparatus specification information is, for example, information including an information processing apparatus ID related to the information processing apparatus 36 of which the information processing apparatus operation rate falls below the second threshold value in the afternoon within the target period. After the process in step ST220 is executed, the medical service support process proceeds to step ST222. The information processing apparatus 36 (for example, the information processing apparatus 36 specified based on the information processing apparatus ID included in the afternoon low operation rate apparatus specification information) which is specified based on the afternoon low operation rate apparatus specification information is an example of the "low operation rate medical device" according to the present disclosed technology.

In step ST222, the generation unit 98F generates second notification information based on the afternoon low operation rate apparatus specification information generated in step ST220. After the processing in step ST222 is executed, the medical service support process proceeds to step ST224 shown in FIG. 11C.

In the present step ST222, the second notification information is information that includes information for notifying of the information processing apparatus 36 that is specified based on the afternoon low operation rate apparatus specification information. Further, the second notification information is also information including the information processing apparatus operation rate (see step ST210 in FIG. 11A) of the information processing apparatus 36 specified based on the afternoon low operation rate apparatus specification information.

Here, the second notification information is an example of the "information for notifying of the low operation rate medical device related information related to the low operation rate medical device specified based on the low operation rate medical device specification information" according to the present disclosed technology. Further, the information processing apparatus operation rate included in the second notification information is an example of the "low operation rate medical device related information related to the low operation rate medical device specified based on the low operation rate medical device specification information" and the "information based on the operation rate of the low operation rate medical device" according to the present disclosed technology.

Further, examples of a notification method using the second notification information include a method of visualizing and notifying of various types of information through the medical service support screen 114 (see FIG. 12).

Figure 11B:
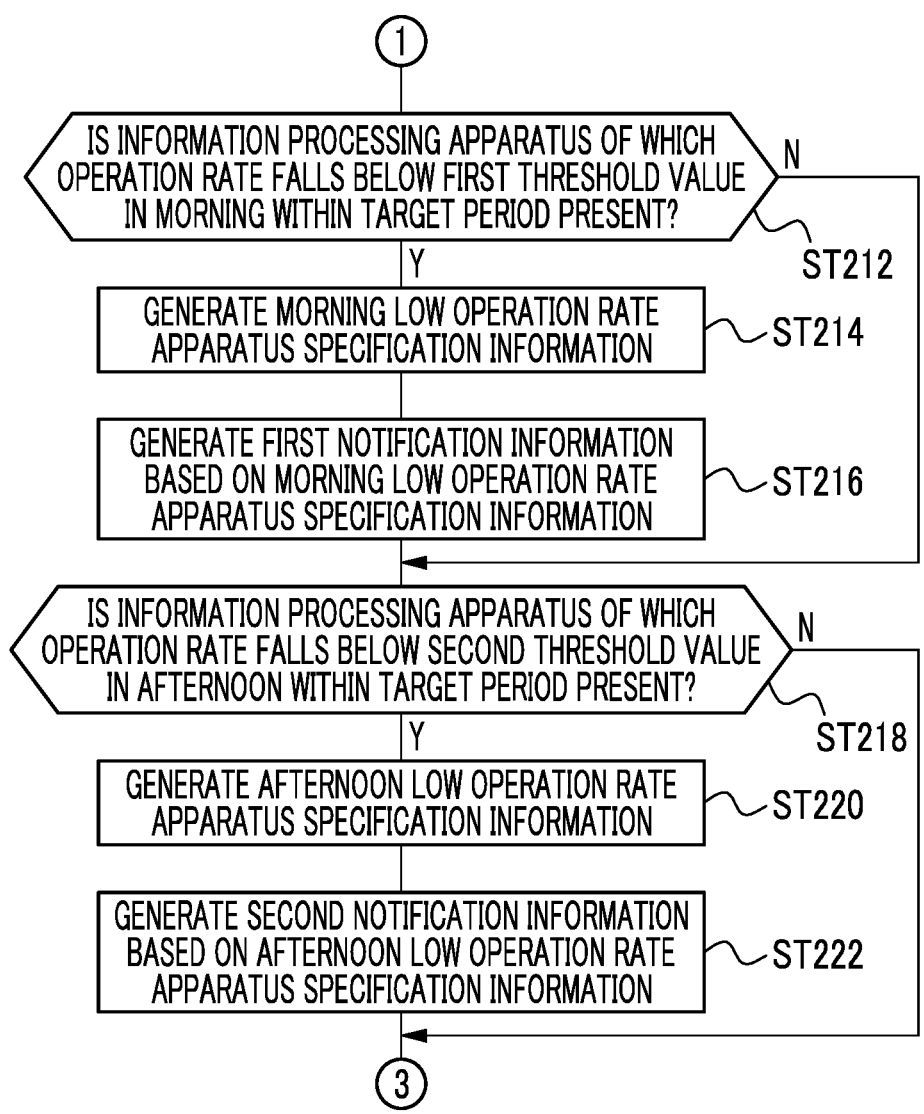
FIG. 11B is a continuation of the flowchart shown in FIG. 11A.
Figure 11C:
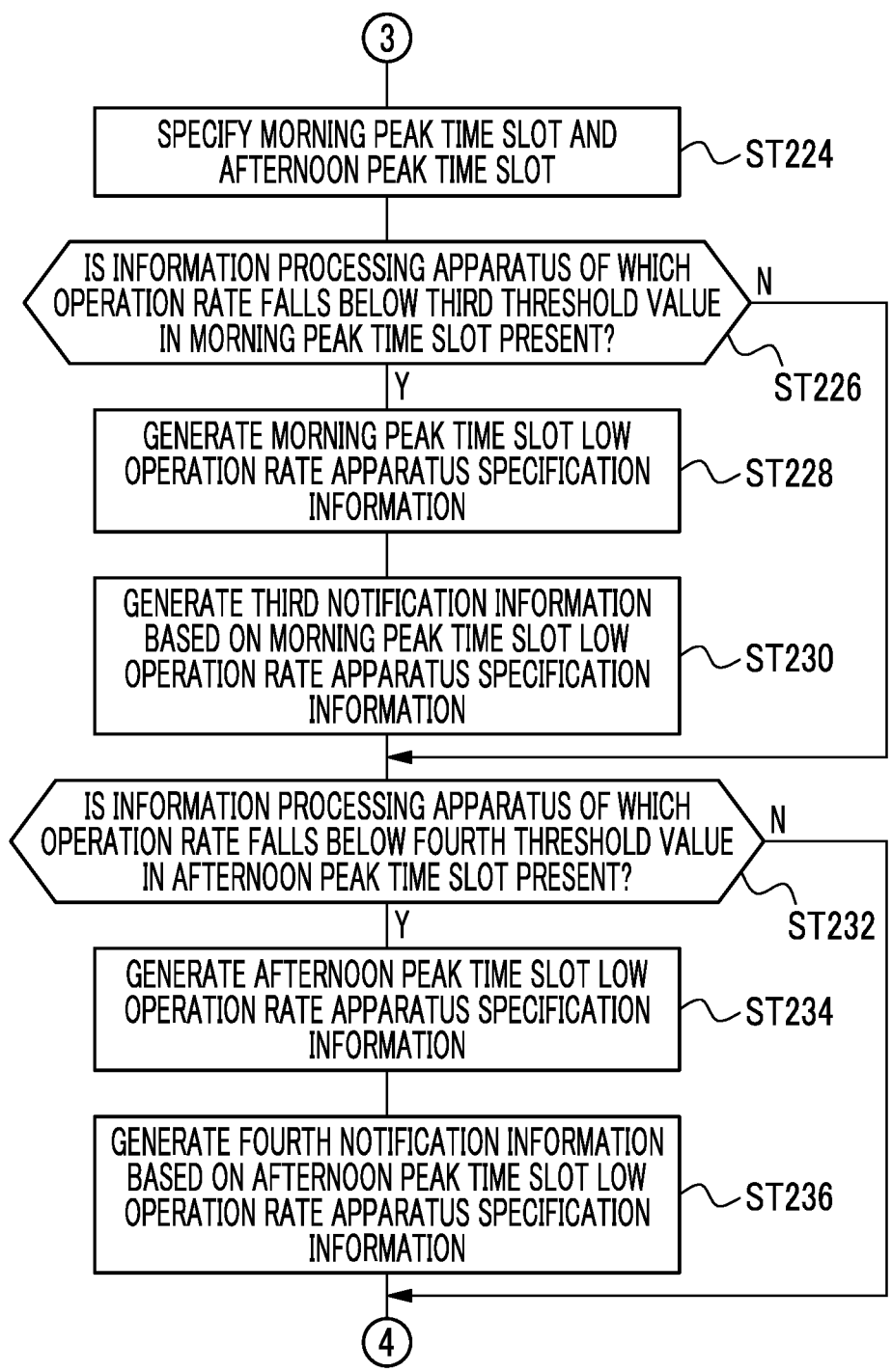
FIG. 11C is a continuation of the flowchart shown in FIG. 11B.

In step ST224 shown in FIG. 11C, the specifying unit 98G specifies a morning peak time slot and an afternoon peak time slot within the target period. After the process in step ST224 is executed, the medical service support process proceeds to step ST226. In the following, for convenience of explanation, a case where it is not necessary to distinguish between the morning peak time slot and the afternoon peak time slot will be referred to as a "peak time slot".

In the present step ST224, the morning peak time slot refers to an examination time slot in which operation statuses of all the information processing apparatuses 36 peak in the morning within the target period. The afternoon peak time slot refers to an examination time slot in which operation statuses of all the information processing apparatuses 36 peak in the afternoon within the target period. The examination time slot in which the operation statuses of all the information processing apparatuses 36 peak corresponds to an examination time slot in which performance statuses of the endoscopies in all the examination rooms 30 peak. Here, the examination time slot on which an endoscopy is performed the highest number of times is defined as the examination time slot in which the operation statuses of all the information processing apparatuses 36 peak. The peak time slot may be an examination time slot in which the number of times an endoscopy is performed exceeds a predetermined number of times and may be an examination time slot in which an average value of the information processing apparatus operation rates is the highest, instead of the examination time slot on which an endoscopy is performed the highest number of times. Further, the peak time slot may be an examination time slot in which a median value of the information processing apparatus operation rates is the highest, may be an examination time slot in which the most frequent value of the information processing apparatus operation rates is the highest, and may be an examination time slot in which the maximum value of the information processing apparatus operation rates is the highest, instead of the examination time slot in which the average value of the information processing apparatus operation rates is the highest.

The peak time slot specified in the present step ST224 is an example of a "a time period when a value based on the number of endoscope procedure services is equal to or greater than the first reference value" according to the present disclosed technology. Further, although the peak time slot is exemplified here, this is merely an example, and a day or a date and time designated by the user or the like may be used instead of the peak time slot.

In step ST226, the generation unit 98F determines whether or not the information processing apparatus 36 of which the information processing apparatus operation rate calculated in step ST210 falls below a third threshold value in the morning peak time slot specified in step ST224 is present. Here, the third threshold value is, for example, a value of 70% of the operation rate of the information processing apparatus 36 with the highest operation rate in the designated examination time slot (for example, the morning peak time slot). Note that 70%, which is exemplified here, is merely an example and a value less than 70% may be used. Further, the third threshold value may be a statistical value such as an average value, a median value, or the most frequent value of the operation rates of a certain number of information processing apparatuses 36 with a higher operation rate among all the information processing apparatuses 36. The third threshold value used in the present step ST226 may be a constant operation rate predetermined as a standard operation rate of the information processing apparatus 36 in the morning peak time slot, or may be a variable value that is changed according to an instruction or the like given by the user or the like.

In the present step ST226, in a case where the information processing apparatus 36 of which the information processing apparatus operation rate calculated in step ST210 falls below the third threshold value in the morning peak time slot specified in step ST224 is not present, a negative determination is made, and the medical service support process proceeds to step ST232. In the present step ST226, in a case where the information processing apparatus 36 of which the information processing apparatus operation rate calculated in step ST210 falls below the third threshold value in the morning peak time slot specified in step ST224 is present, a positive determination is made, and the medical service support process proceeds to step ST228.

In step ST228, the generation unit 98F generates morning peak time slot low operation rate apparatus specification information that specifies the information processing apparatus 36 of which the information processing apparatus operation rate falls below the third threshold value in the morning peak time slot specified in step ST224. The peak morning time slot low operation rate apparatus specification information is, for example, information including the information processing apparatus ID related to the information processing apparatus 36 of which the information processing apparatus operation rate falls below the third threshold value in the morning peak time slot specified in step ST224. After the process in step ST228 is executed, the medical service support process proceeds to step ST230. The information processing apparatus 36 (for example, the information processing apparatus 36 specified based on the information processing apparatus ID included in the morning peak time slot low operation rate apparatus specification information) which is specified based on the morning peak time slot low operation rate apparatus specification information is an example of the "low operation rate medical device" according to the present disclosed technology.

In step ST230, the generation unit 98F generates third notification information based on the morning peak time slot low operation rate apparatus specification information generated in step ST228. After the process in step ST230 is executed, the medical service support process proceeds to step ST232.

In the present step ST230, the third notification information is information that includes information for notifying of the information processing apparatus 36 that is specified based on the morning peak time slot low operation rate apparatus specification information. Further, the third notification information is also information including the information processing apparatus operation rate (see step ST210 in FIG. 11A) of the information processing apparatus 36 specified based on the morning peak time slot low operation rate apparatus specification information.

Here, the third notification information is an example of the "information for notifying of the low operation rate medical device related information related to the low operation rate medical device specified based on the low operation rate medical device specification information" according to the present disclosed technology. Further, the information processing apparatus operation rate included in the third notification information is an example of the "low operation rate medical device related information related to the low operation rate medical device specified based on the low operation rate medical device specification information" and the "information based on the operation rate of the low operation rate medical device" according to the present disclosed technology.

Further, examples of a notification method using the third notification information include a method of visualizing and notifying of various types of information through the medical service support screen 114 (see FIG. 12).

In step ST232, the generation unit 98F determines whether or not the information processing apparatus 36 of which the information processing apparatus operation rate calculated in step ST210 falls below a fourth threshold value in the afternoon peak time slot specified in step ST224 is present. Here, the fourth threshold value is, for example, a value of 70% of the operation rate of the information processing apparatus 36 with the highest operation rate in the designated examination time slot (for example, the afternoon peak time slot). Note that 70%, which is exemplified here, is merely an example and a value less than 70% may be used. Further, the fourth threshold value may be a statistical value such as an average value, a median value, or the most frequent value of the operation rates of a certain number of information processing apparatuses 36 with a higher operation rate among all the information processing apparatuses 36. The fourth threshold value used in the present step ST232 may be a constant operation rate predetermined as a standard operation rate of the information processing apparatus 36 in the afternoon peak time slot, or may be a variable value that is changed according to an instruction or the like given by the user or the like.

In the present step ST232, in a case where the information processing apparatus 36 of which the information processing apparatus operation rate calculated in step ST210 falls below the fourth threshold value in the afternoon peak time slot specified in step ST224 is not present, a negative determination is made, and the medical service support process proceeds to step ST238 shown in FIG. 11D. In the present step ST232, in a case where the information processing apparatus 36 of which the information processing apparatus operation rate calculated in step ST210 falls below the fourth threshold value in the afternoon peak time slot specified in step ST224 is present, a positive determination is made, and the medical service support process proceeds to step ST234.

In step ST234, the generation unit 98F generates afternoon peak time slot low operation rate apparatus specification information that specifies the information processing apparatus 36 of which the information processing apparatus operation rate falls below the fourth threshold value in the afternoon peak time slot specified in step ST224. The afternoon peak time slot low operation rate apparatus specification information is, for example, information including the information processing apparatus ID related to the information processing apparatus 36 of which the information processing apparatus operation rate falls below the fourth threshold value in the afternoon peak time slot specified in step ST224. After the process in step ST234 is executed, the medical service support process proceeds to step ST236. The information processing apparatus 36 (for example, the information processing apparatus 36 specified based on the information processing apparatus ID included in the afternoon peak time slot low operation rate apparatus specification information) which is specified based on the afternoon peak time slot low operation rate apparatus specification information is an example of the "low operation rate medical device" according to the present disclosed technology.

In step ST236, the generation unit 98F generates fourth notification information based on the afternoon peak time slot low operation rate apparatus specification information generated in step ST234. After the processing in step ST236 is executed, the medical service support process proceeds to step ST238 shown in FIG. 11D.

In the present step ST236, the fourth notification information is information that includes information for notifying of the information processing apparatus 36 that is specified based on the afternoon peak time slot low operation rate apparatus specification information. Further, the fourth notification information is also information including the information processing apparatus operation rate (see step ST210 in FIG. 11A) of the information processing apparatus 36 specified based on the afternoon peak time slot low operation rate apparatus specification information.

Here, the fourth notification information is an example of the "information for notifying of the low operation rate medical device related information related to the low operation rate medical device specified based on the low operation rate medical device specification information" according to the present disclosed technology. The information processing apparatus operation rate included in the fourth notification information is an example of the "low operation rate medical device related information related to the low operation rate medical device specified based on the low operation rate medical device specification information" and the "information based on the operation rate of the low operation rate medical device" according to the present disclosed technology.

Further, examples of a notification method using the fourth notification information include a method of visualizing and notifying of various types of information through the medical service support screen 114 (see FIG. 12).

Figure 11D:
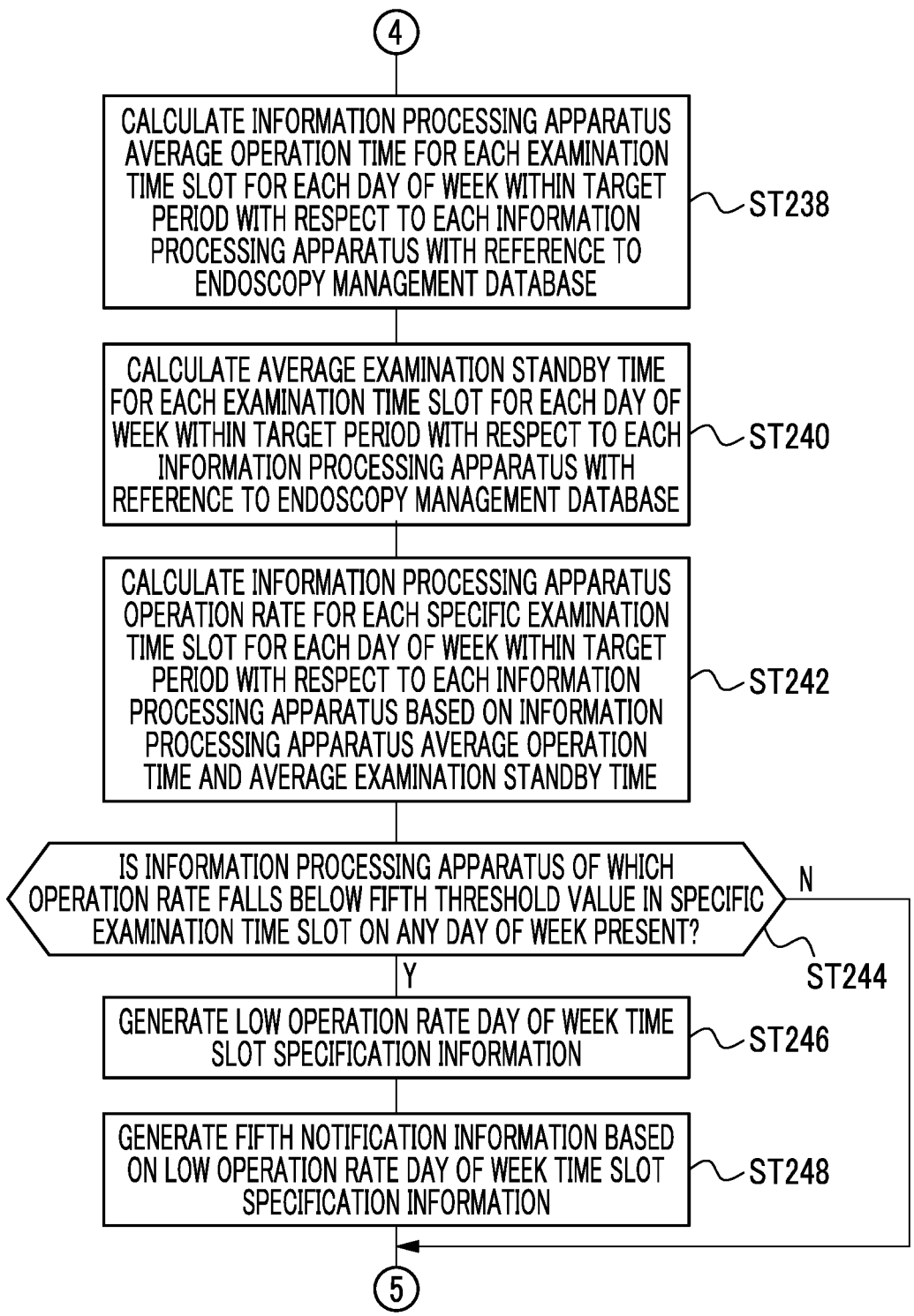
FIG. 11D is a continuation of the flowchart shown in FIG. 11C.

In step ST238 shown in FIG. 11D, the derivation unit 98E calculates information processing apparatus average operation time for each examination time slot for each day of the week within the target period with respect to each of all the information processing apparatuses 36 as a test calculation target, with reference to the endoscopy management database 110 (see FIG. 9). After the process in step ST238 is executed, the medical service support process proceeds to step ST240.

In step ST240, the derivation unit 98E calculates average examination standby time for each examination time for each day of the week within the target period with respect to each of all the information processing apparatuses 36 as a test calculation target, with reference to the endoscopy management database 110 (see FIG. 9). After the process in step ST240 is executed, the medical service support process proceeds to step ST242.

In the present step ST240, the average examination standby time is an average value of the examination standby time of each information processing apparatus 36 for each examination time slot for each day of the week within the target period, in other words, an average value of the examination standby time of each examination room 30 for each examination time slot for each day of the week within the target period.

In step ST242, the derivation unit 98E calculates the information processing apparatus operation rate for each specific examination time slot for each day of the week within the target period with respect to each of all the information processing apparatuses 36 as a test calculation target, based on the information processing apparatus average operation time calculated in step ST238 and on the average examination standby time calculated in step ST240. After the process in step ST242 is executed, the medical service support process proceeds to step ST244.

In the present step ST242, the information processing apparatus operation rate is calculated by the derivation unit 98E according to the expression "(information processing apparatus average operation time)/{(information processing apparatus average operation time)+(average examination standby time)}" for each specific examination time slot for each day of the week within the target period.

Here, the specific examination time slot refers to an examination time slot defined with the start of the morning (for example, 8:00) as a starting point and an examination time slot defined with the start of the afternoon (for example, 13:00) as a starting point. Here, for example, the specific examination time slots are an examination time slot in the early morning (here, as an example, around 8:00), an examination time slot in the late morning (here, as an example, around 11:00), an examination time slot in the early afternoon (here, as an example, around 13:00), and an examination time slot in the late afternoon (here, as an example, around 15:00).

The specific examination time slot may be an examination time slot defined with the end of the morning (for example, 12:00) as a starting point, may be an examination time slot defined with the end of the afternoon (for example, 16:00) as a starting point, may be an examination time slot defined with the start of the day (for example, 8:00) as a starting point, and may be an examination time slot defined with the end of the day (for example, 16:00) as a starting point.

In step ST244, the generation unit 98F determines whether or not the information processing apparatus 36 of which the information processing apparatus operation rate calculated in step ST242 falls below a fifth threshold value (for example, 5%) in the specific examination time slot on any day of the week within the target period is present. Here, the fifth threshold value may be a constant operation rate predetermined as a standard operation rate of the information processing apparatus 36 that operates in the specific examination time slot, or may be a variable value that is changed according to an instruction or the like given by the user or the like. Here, as the fifth threshold value, the same value as that of the first threshold value is applied.

In the present step ST244, in a case where the information processing apparatus 36 of which the information processing apparatus operation rate calculated in step ST242 falls below the fifth threshold value in the specific examination time slot on any day of the week within the target period is not present, a negative determination is made, and the medical service support process proceeds to step ST250 shown in FIG. 11E. In the present step ST244, in a case where the information processing apparatus 36 of which the information processing apparatus operation rate calculated in step ST242 falls below the fifth threshold value in the specific examination time slot on any day of the week within the target period is present, a positive determination is made, and the medical service support process proceeds to step ST246.

In step ST246, the generation unit 98F generates low operation rate day of week time slot specification information that specifies the day of the week and the specific examination time slot in which the information processing apparatus operation rate (see step ST242) falls below the fifth threshold value. After the process in step ST246 is executed, the medical service support process proceeds to step ST248.

In step ST248, the generation unit 98F generates fifth notification information based on the low operation rate day of week time slot specification information generated in step ST246. After the processing in step ST248 is executed, the medical service support process proceeds to step ST250 shown in FIG. 11E.

The fifth notification information is information that includes information for notifying of the day of the week and the specific examination time slot that are specified based on the low operation rate day of week time slot specification information. Further, the fifth notification information is also information that includes the information processing apparatus operation rate that falls below the fifth threshold value among the information processing apparatus operation rates calculated in step ST242, and the information processing apparatus operation rate is associated with the day of the week and the specific examination time slot. Further, the fifth notification information is also information that includes information (for example, the information processing apparatus ID) that specifies the information processing apparatus 36 of which the information processing apparatus operation rate falls below the fifth threshold value. The information which specifies the information processing apparatus 36 of which the information processing apparatus operation rate falls below the fifth threshold value is acquired from the endoscopy management database 110 by the generation unit 98F.

Here, the fifth notification information is the "information for notifying of the low operation rate medical device related information related to the low operation rate medical device that is specified based on the low operation rate medical device specification information" according to the present disclosed technology. Further, the low operation rate day of week time slot specification information is an example of the "low operation rate medical device related information" and the "information based on the operation rate of the low operation rate medical device" according to the present disclosed technology.

Further, examples of a notification method using the fifth notification information include a method of visualizing and notifying of various types of information through the medical service support screen 114 (see FIG. 12).

Figure 11E:
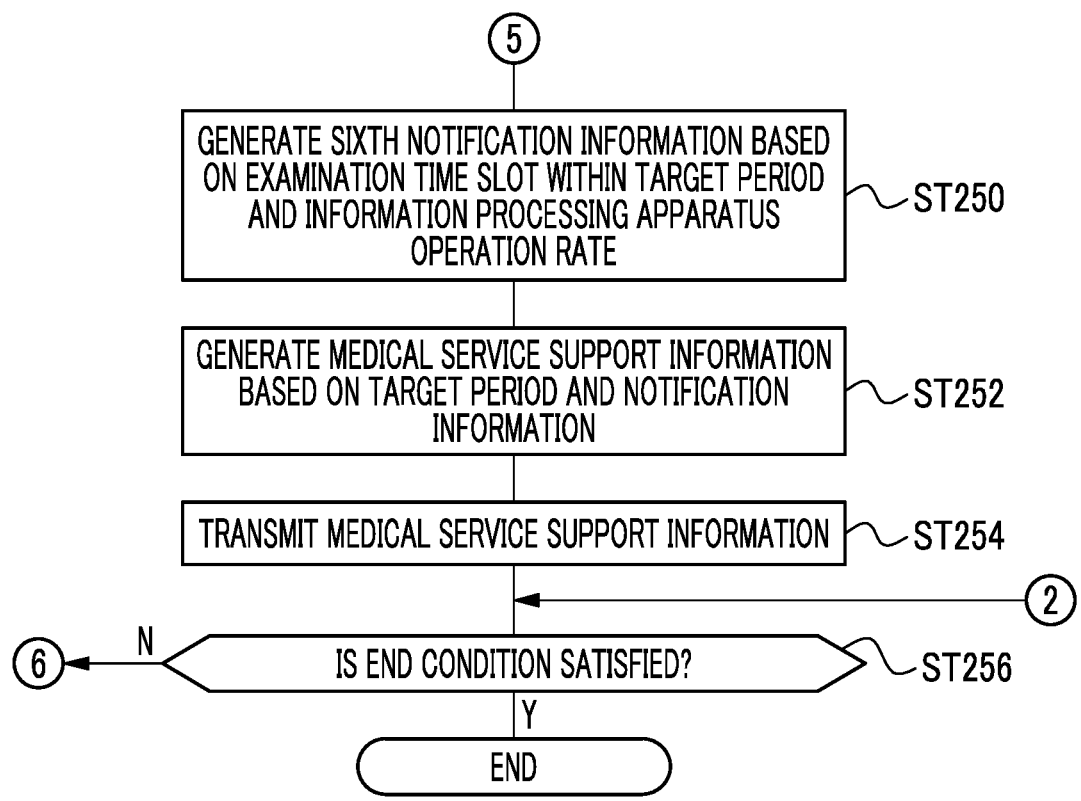
FIG. 11E is a continuation of the flowchart shown in FIG. 11A and FIG. 11D.

In step ST250 shown in FIG. 11E, the generation unit 98F generates sixth notification information based on the examination time slot within the target period and on the information processing apparatus operation rate calculated in step ST210. After the process in step ST250 is executed, the medical service support process proceeds to step ST252.

In the present step ST250, the sixth notification information is information for notifying of the information processing apparatus operation rate in a comparable state with the low operation rate day of week time slot specification information. Further, the sixth notification information is also information for notifying of the low operation rate information processing apparatus quantity information, which indicates a quantity of the information processing apparatuses 36 of which the information processing apparatus operation rate (see step ST210) falls below any one of the first to fourth threshold values, in a comparable state with the information processing apparatus quantity information indicating the quantity of information processing apparatuses 36 operating during the target period among all the information processing apparatuses 36.

Here, although the quantity of the information processing apparatuses 36 of which the information processing apparatus operation rate falls below any one of all of the first to fourth threshold values is exemplified here, the present disclosed technology is not limited to this. For example, a quantity of the information processing apparatuses 36 of which the information processing apparatus operation rate falls below a plurality of threshold values defined in advance among the first to fourth threshold values may be used.

The low operation rate information processing apparatus quantity information is acquired by the generation unit 98F. That is, the generation unit 98F acquires the information processing apparatus ID related to the information processing apparatus 36 of which the information processing apparatus operation rate falls below any one of the first to fourth threshold values from the endoscopy management database 110, specifies the quantity of the information processing apparatuses 36 of which the information processing apparatus operation rate falls below all of the first to fourth threshold values by counting the number of acquired information processing apparatus IDs, and generates information indicating the specified quantity as the low operation rate information processing apparatus quantity information.

The information processing apparatus quantity information is also acquired by the generation unit 98F. That is, the generation unit 98F counts the quantity of the information processing apparatuses 36 with a record of operation within the target period with reference to the endoscopy management database 110, and generates information which indicates the counted quantity, as the information processing apparatus quantity information.

The low operation rate information processing apparatus quantity information is an example of the "information based on the quantity of the low operation rate medical devices" according to the present disclosed technology, and the information processing apparatus quantity information is an example of the "medical device quantity information" according to the present disclosed technology.

The sixth notification information includes the low operation rate day of week time slot specification information, which is generated in step ST246, and the information processing apparatus operation rate, which is calculated in step ST210, in a state of being associated with each other. Further, the sixth notification information includes the low operation rate information processing apparatus quantity information. Further, the sixth notification information includes the information processing apparatus quantity information.

In step ST252, the generation unit 98F generates the medical service support information based on the target period and on the notification information. After the process in step ST252 is executed, the medical service support process proceeds to step ST254.

The medical service support information includes the target period. Further, the medical service support information includes the notification information obtained by executing the process, among the process of step ST216, the process of step ST222, the process of step ST230, the process of step ST236, the process of step ST248, and the process of step ST250, by the generation unit 98F.

The medical service support information is information that can be classified by a default unit. That is, the medical service support information is information that can be classified by a unit of the information processing apparatus ID (for example, a serial number of the information processing apparatus 36), and is also information that can be classified by a unit of the examination time slot. Here, the information processing apparatus ID is an example of the "related information related to the medical device" according to the present disclosed technology, and the examination time slot is an example of the "time slot" according to the present disclosed technology.

Examples of the default unit include a medical device unit. The medical device unit indicates, for example, a unit classified by related information that can identify a predetermined medical device from a plurality of medical devices. Here, although the information processing apparatus ID is exemplified as the related information that can identify the medical device, this is merely an example, and the related information may be related information that is related to the information processing apparatus 36 instead of the information processing apparatus ID or together with the information processing apparatus ID, and may be information that includes information capable of specifying which sales series the information processing apparatus 36 belongs to and/or information capable of specifying the manufacturer of the information processing apparatus 36. In other words, the related information that can identify the predetermined medical device may be the related information that can identify medical devices having the same function, medical devices made by the same manufacturer, or medical devices with the same sales series.

Further, the medical service support information is information that is capable of being represented via a comment, a figure, or the like by a presentation device (here, the display 72 as an example) and includes screen information indicating the medical service support screen 114 (see FIG. 12). Here, although the screen information is generated by the medical service support device 20 as an example of the embodiment, this is merely an example, and the screen information may be generated by another device such as the endoscope part management device 12 or the like, for example.

In step ST254, the transmission unit 98B transmits the medical service support information, which is generated in step ST252, to the endoscope part management device main body 68 via the communication I/F 104 (see FIG. 7). After the process in step ST254 is executed, the medical service support process proceeds to step ST256.

In step ST256, the transmission unit 98B determines whether or not a condition for ending the medical service support process (hereinafter, referred to as a "medical service support process end condition") is satisfied. Examples of the medical service support process end condition include a condition that an instruction for ending the medical service support process is received by the reception device (not shown).

In step ST256, in a case where the medical service support process end condition is not satisfied, a negative determination is made, and the medical service support process proceeds to step ST200. In step ST256, in a case where the medical service support process end condition is satisfied, a positive determination is made, and the medical service support process is ended.

In a case where the medical service support information is transmitted by executing the process of step ST254, as described above, the medical service support information is received through the support device communication I/F 84 of the endoscope part management device 12 (see step ST110 shown in FIG. 10). As shown in step ST112 shown in FIG. 10, the display control unit 78D of the endoscope part management device 12 generates the medical service support screen 114 based on the medical service support information, and the generated medical service support screen 114 is displayed on the display 72 (FIG. 1 and FIG. 3) (see FIG. 12).

In the following, in the present first embodiment, for convenience of explanation, a case will be described where the operation status (performance status of the endoscopy) of each information processing apparatus 36, which is installed in each of four examination rooms 30, is presented to the user or the like via the display 72 as the medical service support screen 114. Further, the four examination rooms 30 are a first examination room, a second examination room, a third examination room, and a fourth examination room. Further, in the following, for convenience of explanation, the information processing apparatus 36 installed in the first examination room is called a first information processing apparatus, the information processing apparatus 36 installed in the second examination room is called a second information processing apparatus, the information processing apparatus 36 installed in the third examination room is called a third information processing apparatus, and the information processing apparatus 36 installed in the fourth examination room is called a fourth information processing apparatus.

As an example, as shown in FIG. 12, on the medical service support screen 114, a screen title display field 114A, a target period display field 114B, a low operation rate device quantity display field 114C, an explanatory note display field 114D, an examination support graph 114E, a target period comment display field 114F, a peak time slot comment display field 114G, a first specific examination time slot comment display field 114H, a second specific examination time slot comment display field 114I, a third specific examination time slot comment display field 114J, and a fourth specific examination time slot comment display field 114K are displayed.

In the screen title display field 114A, a title that can be recognized as a screen for supporting raising of the operation rate floor of the information processing apparatus 36 is displayed. In the example shown in FIG. 12, "operation rate floor-raising support screen" is displayed in the screen title display field 114A.

In the target period display field 114B, a target period is displayed. In the example shown in FIG. 12, a period of "target period: February 20XX to May 20XX" is displayed in the target period display field 114B.

In the low operation rate device quantity display field 114C, the quantity, which is indicated by the low operation rate information processing apparatus quantity information, is displayed. In the example shown in FIG. 12, a comment such as "Low operation rate: ¼" is displayed as the recognizable information that one information processing apparatus 36 out of the four information processing apparatuses 36 has a low operation rate. That is, the fact that the quantity of the information processing apparatuses 36 of which the information processing apparatus operation rate falls below all of the first to fourth threshold values is one is represented via a comment in the low operation rate device quantity display field 114C. Further, in the low operation rate device quantity display field 114C, a downward arrow indicating that the operation rate is low is also displayed.

In the explanatory note display field 114D, an explanatory note, which is related to the examination support graph 114E, is displayed. In the example shown in FIG. 12, in the explanatory note display field 114D, an explanatory note of the first information processing apparatus installed in the first examination room, an explanatory note of the second information processing apparatus installed in the second examination room, an explanatory note of the third information processing apparatus installed in the third examination room, and an explanatory note of the fourth information processing apparatus installed in the fourth examination room are displayed. Further, in the example shown in FIG. 12, a downward arrow indicating that the fourth information processing apparatus has a low operation rate is also displayed in the explanatory note display field 114D, and therefore, the user or the like can visually ascertain which information processing apparatus 36 has a low operation rate. Further, in the explanatory note display field 114D, the user or the like can visually ascertain the quantity of the information processing apparatuses 36 with a low operation rate through the number of downward arrows displayed.

The examination support graph 114E is an example of a "figure" according to the present disclosed technology. The examination support graph 114E is a graph created based on the sixth notification information generated by executing the process of step ST250 shown in FIG. 11E, and indicates the time change of the information processing apparatus operation rate. A horizontal axis of the examination support graph 114E is the examination time slot, and a vertical axis of the examination support graph 114E is the information processing apparatus operation rate.

In the examination support graph 114E, the examination time slot which has the highest information processing apparatus operation rate in the morning and the examination time slot which has the highest information processing apparatus operation rate in the afternoon are displayed in a manner distinguishable (in the example shown in FIG. 12, dot-shaped hatching surrounded by a broken line frame) from other regions. In the example shown in FIG. 12, around 11:00 is shown as an example of the examination time slot having the highest information processing apparatus operation rate in the morning, and around 15:00 is shown as an example of the examination time slot having the highest information processing apparatus operation rate in the afternoon.

In the target period comment display field 114F, a comment created based on the first notification information generated in step ST216 shown in FIG. 11B and on the second notification information generated in step ST222 shown in FIG. 11B is displayed. That is, in the target period comment display field 114F, a comment in which the information processing apparatus 36 that is specified based on the morning low operation rate apparatus specification information is notified of, a comment in which the information processing apparatus operation rate of the information processing apparatus 36 that is specified based on the morning low operation rate apparatus specification information is notified of, a comment in which the information processing apparatus 36 that is specified based on the afternoon low operation rate apparatus specification information is notified of, and a comment in which the information processing apparatus operation rate of the information processing apparatus 36 that is specified based on the afternoon low operation rate apparatus specification information is notified of are displayed. In the example shown in FIG. 12, the target period comment display field 114F is classified into a morning field and an afternoon field, and a comment "The fourth information processing apparatus (fourth examination room) is hardly used. (Operation rate=0%)" is displayed in both the morning field and the afternoon field.

In the peak time slot comment display field 114G, a comment created based on the third notification information generated in step ST230 shown in FIG. 11C and on the fourth notification information generated in step ST236 shown in FIG. 11C is displayed. That is, in the peak time slot comment display field 114G, a comment in which the information processing apparatus 36 that is specified based on the morning peak time slot low operation rate apparatus specification information is notified of, a comment in which the information processing apparatus operation rate of the information processing apparatus 36 that is specified based on the morning peak time slot low operation rate apparatus specification information is notified of, a comment in which the information processing apparatus 36 that is specified based on the afternoon peak time slot low operation rate apparatus specification information is notified of, and a comment in which the information processing apparatus operation rate of the information processing apparatus 36 that is specified based on the afternoon peak time slot low operation rate apparatus specification information is notified of are displayed. In the example shown in FIG. 12, the peak time slot comment display field 114G is classified into a morning field and an afternoon field, and a comment "The fourth information processing apparatus (fourth examination room) is hardly used. (Operation rate=0%)" is displayed in both the morning field and the afternoon field.

In the first specific examination time slot comment display field 114H, a comment created based on the fifth notification information shown in FIG. 11D is displayed. That is, in the first specific examination time slot comment display field 114H, a comment in which the day of the week that is specified based on the low operation rate day of week time slot specification information is notified of, a comment in which the examination time slot in the early morning that is specified based on the low operation rate day of week time slot specification information is notified of, and a comment in which the information processing apparatus operation rate that falls below the fifth threshold value among the information processing apparatus operating rates calculated in step ST242 is notified of are displayed. In the example shown in FIG. 12, the examination time slot of "Around 8:00" is displayed in the first specific examination time slot comment display field 114H, and a comment "Tuesday's operation rate is low (operation rate=10%)" is displayed.

In the second specific examination time slot comment display field 114I, a comment created based on the fifth notification information shown in FIG. 11D is displayed. That is, in the second specific examination time slot comment display field 114I, a comment in which the day of the week that is specified based on the low operation rate day of week time slot specification information is notified of, a comment in which the examination time slot in the early afternoon that is specified based on the low operation rate day of week time slot specification information is notified of, and a comment in which the information processing apparatus operation rate that falls below the fifth threshold value among the information processing apparatus operating rates calculated in step ST242 is notified of are displayed. In the example shown in FIG. 12, the examination time slot of "Around 13:00" is displayed in the second specific examination time slot comment display field 114I, and a comment "Tuesday's operation rate is low (operation rate=10%)" is displayed.

Here, although an example of the embodiment has been described in which a comment in which the examination time slot in the early morning is notified of, a comment in which the day of the week that is specified based on the low operation rate day of week time slot specification information is notified of, and a comment in which the information processing apparatus operation rate that falls below the fifth threshold value among the information processing apparatus operation rates calculated in step ST242 is notified of are displayed in the first specific examination time slot comment display field 114H, and a comment in which the examination time slot in the early afternoon is notified of, a comment in which the day of the week that is specified based on the low operation rate day of week time slot specification information is notified of, and a comment in which the information processing apparatus operation rate that falls below the fifth threshold value among the information processing apparatus operation rates calculated in step ST242 is notified of are displayed in the second specific examination time slot comment display field 114I, the present disclosed technology is not limited to this. That is, a comment in which the day of the week that is specified based on the low operation rate day of week time slot specification information is notified of and a comment in which the information processing apparatus operation rate that falls below the fifth threshold value among the information processing apparatus operating rates calculated in step ST242 is notified of may be displayed in a state in which the examination time slot is grouped like "around 8:00 and around 13:00" without dividing the examination time slot like "around 8:00" and "around 13:00".

In the third specific examination time slot comment display field 114J, a comment created based on the fifth notification information shown in FIG. 11D is displayed. That is, in the third specific examination time slot comment display field 114J, a comment in which the day of the week that is specified based on the low operation rate day of week time slot specification information is notified of, a comment in which the examination time slot in the late morning that is specified based on the low operation rate day of week time slot specification information is notified of, and a comment in which the information processing apparatus operation rate that falls below the fifth threshold value among the information processing apparatus operating rates calculated in step ST242 is notified of are displayed. In the example shown in FIG. 12, the examination time slot of "Around 11:00" is displayed in the third specific examination time slot comment display field 114J, and a comment "Monday's operation rate is low (operation rate=10%)" is displayed.

In the fourth specific examination time slot comment display field 114K, a comment created based on the fifth notification information shown in FIG. 11D is displayed. That is, in the fourth specific examination time slot comment display field 114K, a comment in which the day of the week that is specified based on the low operation rate day of week time slot specification information is notified of, a comment in which the examination time slot in the late afternoon that is specified based on the low operation rate day of week time slot specification information is notified of, and a comment in which the information processing apparatus operation rate that falls below the fifth threshold value among the information processing apparatus operating rates calculated in step ST242 is notified of are displayed. In the example shown in FIG. 12, the examination time slot of "Around 15:00" is displayed in the fourth specific examination time slot comment display field 114K, and a comment "Monday's operation rate is low (operation rate=10%)" is displayed.

Here, although an example of the embodiment has been described in which in the third specific examination time slot comment display field 114J, a comment in which the examination time slot in the late morning is notified of, a comment in which the day of the week that is specified based on the low operation rate day of week time slot specification information is notified of, and a comment in which the information processing apparatus operation rate that falls below the fifth threshold value among the information processing apparatus operation rates calculated in step ST242 is notified of are displayed, and in the fourth specific examination time slot comment display field 114K, a comment in which the examination time slot in the late afternoon is notified of, a comment in which the day of the week that is specified based on the low operation rate day of week time slot specification information is notified of, and a comment in which the information processing apparatus operation rate that falls below the fifth threshold value among the information processing apparatus operation rates calculated in step ST242 is notified of are displayed, the present disclosed technology is not limited to this. That is, a comment in which the day of the week that is specified based on the low operation rate day of week time slot specification information is notified of and a comment in which the information processing apparatus operation rate that falls below the fifth threshold value among the information processing apparatus operating rates calculated in step ST242 is notified of may be displayed in a state in which the examination time slot is grouped like "around 11:00 and around 15:00" without dividing the examination time slot like "around 11:00" and "around 15:00".

As described above, in the medical service support device 20 according to the present first embodiment, the low operation rate information processing apparatus specification information that is capable of specifying the low operation rate information processing apparatus of which the information processing apparatus operation rate falls below the threshold value, among all the information processing apparatuses 36 used in the endoscope handling service, is acquired. Further, in the medical service support device 20, the medical service support information obtained based on the low operation rate information processing apparatus specification information is generated and transmitted to the endoscope part management device 12. In the endoscope part management device 12, the medical service support screen 114 is generated based on the medical service support information and is displayed on the display 72. Since the medical service support screen 114 is presented to the user or the like in a state in which the medical service support information is visualized, the user or the like ascertains which information processing apparatus 36 has room for increasing the operation rate. Therefore, according to the present configuration, it is possible to support the efficient performance of the endoscope handling service.

Further, in the medical service support device 20, the low operation rate information processing apparatus specification information is acquired for the time period when the overall operation degree of the information processing apparatus 36 is equal to or higher than the reference degree. Further, in the medical service support device 20, the medical service support information is generated for the time period when the overall operation degree of the information processing apparatus 36 is equal to or higher than the reference degree, and transmitted to the endoscope part management device 12. In the endoscope part management device 12, the medical service support screen 114 is generated based on the medical service support information and is displayed on the display 72. Therefore, according to the present configuration, for the time period when the overall operation degree of the information processing apparatus 36 is equal to or higher than the reference degree, the user or the like can ascertain which information processing apparatus 36 has room for increasing the operation rate.

Further, in the medical service support device 20, the low operation rate information processing apparatus specification information that is capable of specifying the low operation rate information processing apparatus of which the information processing apparatus operation rate falls below the threshold value in the morning peak time slot is acquired. Further, in the medical service support device 20, the medical service support information obtained based on the low operation rate information processing apparatus specification information is generated and transmitted to the endoscope part management device 12. In the endoscope part management device 12, the medical service support screen 114 is generated based on the medical service support information and is displayed on the display 72. Therefore, according to the present configuration, for the morning peak time slot, the user or the like can ascertain which information processing apparatus 36 has room for increasing the operation rate.

Further, in the medical service support device 20, the low operation rate information processing apparatus specification information that is capable of specifying the low operation rate information processing apparatus of which the information processing apparatus operation rate falls below the threshold value in the afternoon peak time slot is acquired. Further, in the medical service support device 20, the medical service support information obtained based on the low operation rate information processing apparatus specification information is generated and transmitted to the endoscope part management device 12. In the endoscope part management device 12, the medical service support screen 114 is generated based on the medical service support information and is displayed on the display 72. Therefore, according to the present configuration, for the afternoon peak time slot, the user or the like can ascertain which information processing apparatus 36 has room for increasing the operation rate.

Further, the peak time slot is an examination time slot on which an endoscopy is performed the highest number of times. That is, in the medical service support device 20, the low operation rate information processing apparatus specification information is acquired that is capable of specifying the low operation rate information processing apparatus of which the information processing apparatus operation rate falls below the threshold value in the examination time slot on which an endoscopy is performed the highest number of times. Further, in the medical service support device 20, the medical service support information obtained based on the low operation rate information processing apparatus specification information is generated and transmitted to the endoscope part management device 12. In the endoscope part management device 12, the medical service support screen 114 is generated based on the medical service support information and is displayed on the display 72. Therefore, according to the present configuration, for the examination time slot on which an endoscopy is performed the highest number of times, the user or the like can ascertain which information processing apparatus 36 has room for increasing the operation rate.

Further, the peak time slot may be an examination time slot in which an average value of the information processing apparatus operation rates is the highest. In this case, for the examination time slot in which the average value of the information processing apparatus operation rates is the highest, the user or the like can ascertain which information processing apparatus 36 has room for increasing the operation rate.

Further, the peak time slot may be an examination time slot in which a median value of the information processing apparatus operation rates is the highest. In this case, for the examination time slot in which the median value of the information processing apparatus operation rates is the highest, the user or the like can ascertain which information processing apparatus 36 has room for increasing the operation rate.

Further, the peak time slot may be an examination time slot in which the most frequent value of the information processing apparatus operation rates is the highest. In this case, for the examination time slot in which the most frequent value of the information processing apparatus operation rates is the highest, the user or the like can ascertain which information processing apparatus 36 has room for increasing the operation rate.

Further, the peak time slot may be an examination time slot in which the maximum value of the information processing apparatus operation rates is the highest. In this case, for the examination time slot in which the maximum value of the information processing apparatus operation rates is the highest, the user or the like can ascertain which information processing apparatus 36 has room for increasing the operation rate.

Further, in the endoscope part management device 12, the medical service support screen 114 is generated based on the medical service support information and is displayed on the display 72. Therefore, according to the present configuration, it is possible for the user or the like to visually ascertain the medical service support information.

Further, the medical service support information is information that can be classified by the default unit, and in the endoscope part management device 12, the medical service support screen 114, which is in a state in which the medical service support information is classified by the default unit, is generated and displayed on the display 72. Therefore, according to the present configuration, the user or the like can ascertain the medical service support information classified by the default unit.

Further, the medical service support information is information that can be classified by a unit of the information processing apparatus 36, and in the endoscope part management device 12, the medical service support screen 114, which is in a state in which the medical service support information is classified by the unit of the information processing apparatus 36, is generated and displayed on the display 72. Therefore, according to the present configuration, the user or the like can ascertain the medical service support information classified by the unit of the information processing apparatus 36.

Further, the medical service support information is information that can be classified by the examination time slot, and in the endoscope part management device 12, the medical service support screen 114, which is in a state in which the medical service support information is classified by the examination time slot, is generated and displayed on the display 72. Therefore, according to the present configuration, the user or the like can ascertain the medical service support information classified by the examination time slot.

Further, the medical service support information is information that can be classified by the examination time slot in the early morning, and in the endoscope part management device 12, the medical service support screen 114, which is in a state in which the medical service support information is classified by the examination time slot in the early morning, is generated and displayed on the display 72. Therefore, according to the present configuration, the user or the like can ascertain the medical service support information classified by the examination time slot in the early morning.

Further, the medical service support information is information that can be classified by the examination time slot in the late morning, and in the endoscope part management device 12, the medical service support screen 114, which is in a state in which the medical service support information is classified by the examination time slot in the late morning, is generated and displayed on the display 72. Therefore, according to the present configuration, the user or the like can ascertain the medical service support information classified by the examination time slot in the late morning.

Further, the medical service support information is information that can be classified by the examination time slot in the early afternoon, and in the endoscope part management device 12, the medical service support screen 114, which is in a state in which the medical service support information is classified by the examination time slot in the early afternoon, is generated and displayed on the display 72. Therefore, according to the present configuration, the user or the like can ascertain the medical service support information classified by the examination time slot in the early afternoon.

Further, the medical service support information is information that can be classified by the examination time slot in the late afternoon, and in the endoscope part management device 12, the medical service support screen 114, which is in a state in which the medical service support information is classified by the examination time slot in the late afternoon, is generated and displayed on the display 72. Therefore, according to the present configuration, the user or the like can ascertain the medical service support information classified by the examination time slot in the late afternoon.

Further, the medical service support information includes the first notification information as information for notifying of the information processing apparatus 36 that is specified based on the morning low operation rate apparatus specification information. The medical service support screen 114 is created based on the first notification information. Therefore, according to the present configuration, the user or the like can ascertain the information processing apparatus 36 which is specified based on the morning low operation rate apparatus specification information, through the medical service support screen 114.

Further, the medical service support information includes the second notification information as information for notifying of the information processing apparatus 36 that is specified based on the afternoon low operation rate apparatus specification information. The medical service support screen 114 is created based on the second notification information. Therefore, according to the present configuration, the user or the like can ascertain the information processing apparatus 36 which is specified based on the afternoon low operation rate apparatus specification information, through the medical service support screen 114.

Further, the medical service support information includes the third notification information as information for notifying of the information processing apparatus 36 that is specified based on the morning peak time slot low operation rate apparatus specification information. The medical service support screen 114 is created based on the third notification information. Therefore, according to the present configuration, the user or the like can ascertain the information processing apparatus 36 which is specified based on the morning peak time slot low operation rate apparatus specification information, through the medical service support screen 114.

Further, the medical service support information includes the fourth notification information as information for notifying of the information processing apparatus 36 that is specified based on the afternoon peak time slot low operation rate apparatus specification information. The medical service support screen 114 is created based on the fourth notification information. Therefore, according to the present configuration, the user or the like can ascertain the information processing apparatus 36 which is specified based on the afternoon peak time slot low operation rate apparatus specification information, through the medical service support screen 114.

Further, the medical service support information includes the fifth notification information. The fifth notification information includes information for notifying of the day of the week and the specific examination time slot that are specified based on the low operation rate day of week time slot specification information. Further, the fifth notification information includes the information processing apparatus operation rate that falls below the fifth threshold value among the information processing apparatus operation rates calculated in step ST242. Further, the fifth notification information includes information that specifies the information processing apparatus 36 of which the information processing apparatus operation rate falls below the fifth threshold value. The medical service support screen 114 is created based on the fifth notification information. Therefore, according to the present configuration, the user or the like can ascertain, through the medical service support screen 114, the day of the week specified based on the low operation rate day of week time slot specification information, the specific examination time slot specified based on the low operation rate day of week time slot specification information, the information processing apparatus operation rate that falls below the fifth threshold value among the information processing apparatus operation rates calculated in step ST242, and the information processing apparatus 36 of which the information processing apparatus operation rate falls below the fifth threshold value.

Further, the medical service support information includes the sixth notification information. The sixth notification information includes the low operation rate information processing apparatus quantity information. The medical service support screen 114 is created based on the sixth notification information. Therefore, according to the present configuration, the user or the like can ascertain the quantity of the low operation rate information processing apparatuses which are specified based on the low operation rate information processing apparatus quantity information, through the medical service support screen 114.

Further, the sixth notification information is information for notifying of the information processing apparatus operation rate in a comparable state with the low operation rate day of week time slot specification information. Therefore, according to the present configuration, the user or the like can ascertain the information processing apparatus operation rate in a comparable state with the quantity of the low operation rate information processing apparatuses which are specified based on the low operation rate day of week time slot specification information, through the medical service support screen 114.

Further, in the medical service support device 20, the information processing apparatus operation rate is calculated for each examination time slot within the target period with respect to each of all the information processing apparatuses 36, based on the information processing apparatus average operation time and the average examination standby time, and the information processing apparatus operation rate is included in the sixth notification information. Therefore, according to the present configuration, the user or the like can ascertain the information processing apparatus operation rate for each examination time slot within the target period with respect to each of all the information processing apparatuses 36, through the medical service support screen 114.

Further, the sixth notification information is information for notifying of the information processing apparatus operation rate in a comparable state with the low operation rate day of week time slot specification information. Therefore, according to the present configuration, the user or the like can ascertain the information processing apparatus operation rate in a comparable state with the day of the week specified based on the low operation rate day of week time slot specification information and the examination time slot specified based on the low operation rate day of week time slot specification information, through the medical service support screen 114.

Further, the medical service support information is information that is capable of being represented via a comment and a figure (for example, the examination support graph 114E) on the display 72. Therefore, according to the present configuration, it is possible for the user or the like to visually ascertain the medical service support information.

Second Embodiment

In the above first embodiment, although an example of the embodiment has been described in which the transition of the information processing apparatus operation rate for each examination time slot is presented in graph form, in a second embodiment, a case will be described in which the transition of the information processing apparatus operation rate for each day of the week is presented in graph form. Further, in the present second embodiment, the same components as those in the first embodiment are designated by the same reference numerals, the description thereof will be omitted, and the parts different from those in the first embodiment will be described.

Figure 13:
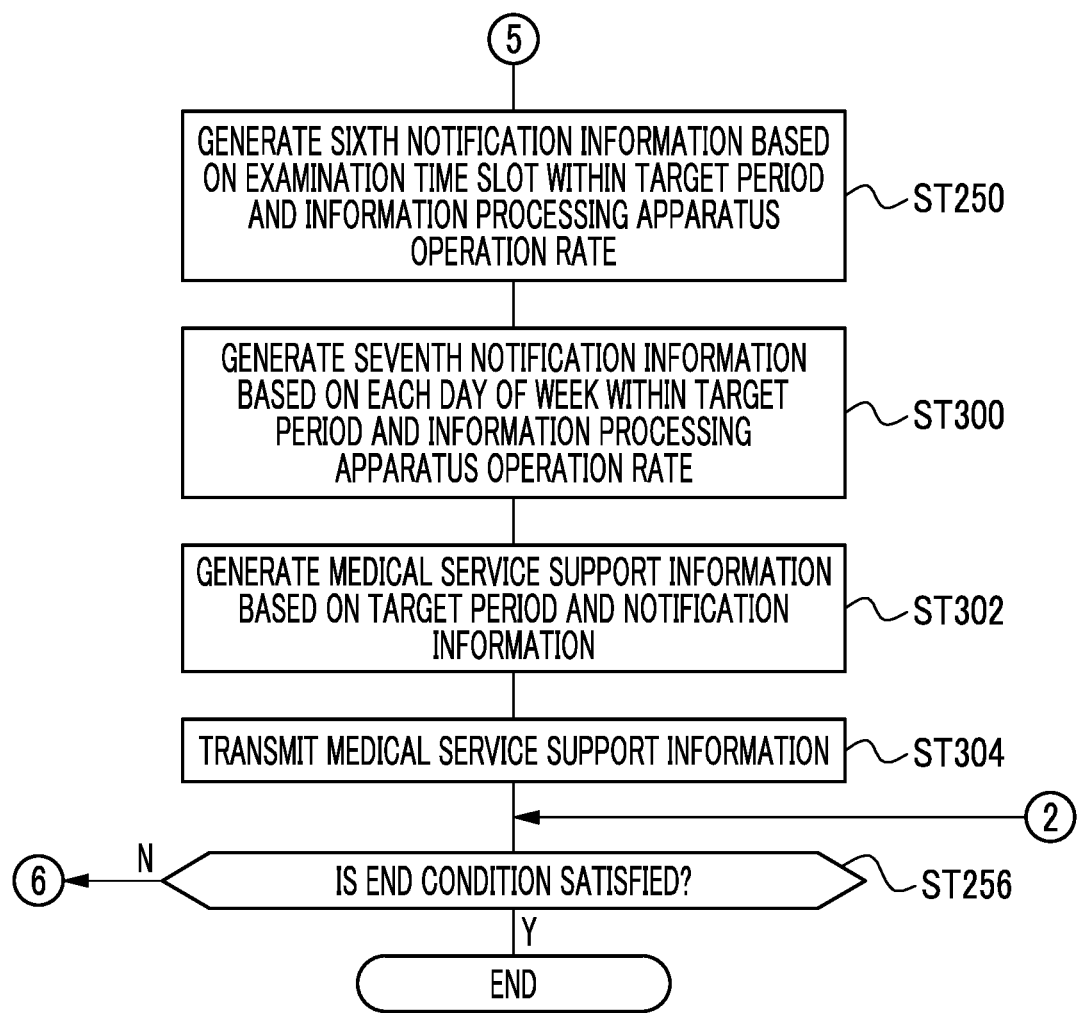
FIG. 13 is a flowchart showing an example of a flow of a medical service support process according to a second embodiment.

FIG. 13 shows an example of a flow of a medical service support process according to the present second embodiment.

As an example, as shown in FIG. 13, the medical service support process according to the present second embodiment differs from the medical service support process described in the first embodiment in that it has step ST300 and step ST302 instead of step ST252 in the flowchart shown in FIG. 11E, and it has step ST304 instead of step ST254 in the flowchart shown in FIG. 11E. Therefore, in the present second embodiment, steps that are the same as those included in the flowchart shown in FIG. 11A to FIG. 11E are given the same step numbers, the description thereof will be omitted, and steps of the flowchart shown in FIG. 13 different from those included in the flowchart shown in FIG. 11 will be described.

In the medical service support process shown in FIG. 13, in step ST300, the generation unit 98F generates seventh notification information based on each day of the week within the target period and on the information processing apparatus operation rate calculated in step ST210. After the process in step ST300 is executed, the medical service support process proceeds to step ST302.

In the present step ST300, the seventh notification information is information for notifying of the information processing apparatus operation rate for each day of the week within the target period with respect to each of all the information processing apparatuses 36. The seventh notification information includes the information processing apparatus operation rate for each day of the week within the target period with respect to each of all the information processing apparatuses 36. The seventh notification information includes an information processing apparatus morning operation rate and an information processing apparatus afternoon operation rate as the information processing apparatus operation rate.

The information processing apparatus morning operation rate is the information processing apparatus operation rate for each day of the week within the target period in the morning (for example, from around 8:00 to around 11:00). The information processing apparatus operation rate in the morning refers to, for example, an average value of operation rates with respect to each of the information processing apparatuses 36 in the morning. The information processing apparatus afternoon operation rate is the information processing apparatus operation rate for each day of the week within the target period in the afternoon (for example, from around 12:00 to around 16:00). The information processing apparatus operation rate in the afternoon refers to, for example, an average value of operation rates with respect to each of the information processing apparatuses 36 in the afternoon.

The seventh notification information is an example of the "information for notifying of the medical device operation rate information in a comparable state with the low operation rate medical device related information" according to the present disclosed technology. The day of the week within the target period is an example of the "default unit" and the "time slot" according to the present disclosed technology.

In step ST302, the generation unit 98F generates the medical service support information based on the target period and on the notification information. After the process in step ST302 is executed, the medical service support process proceeds to step ST304.

The medical service support information includes the target period. Further, the medical service support information includes the notification information obtained by executing the process, among the process of step ST216, the process of step ST222, the process of step ST230, the process of step ST236, the process of step ST248, the process of step ST250, and the process of step ST300, by the generation unit 98F.

In step ST304, the transmission unit 98B transmits the medical service support information, which is generated in step ST302, to the endoscope part management device main body 68 via the communication I/F 104 (see FIG. 7). After the process in step ST304 is executed, the medical service support process proceeds to step ST256.

In a case where the medical service support information is transmitted by executing the process of step ST304, as described above, the medical service support information is received through the support device communication I/F 84 of the endoscope part management device 12 (see step ST110 shown in FIG. 10). As shown in step ST112 shown in FIG. 10, the display control unit 78D of the endoscope part management device 12 generates a medical service support screen 116 based on the medical service support information, and the generated medical service support screen 114 is displayed on the display 72 (FIG. 1 and FIG. 3) (see FIG. 14).

Figure 14:
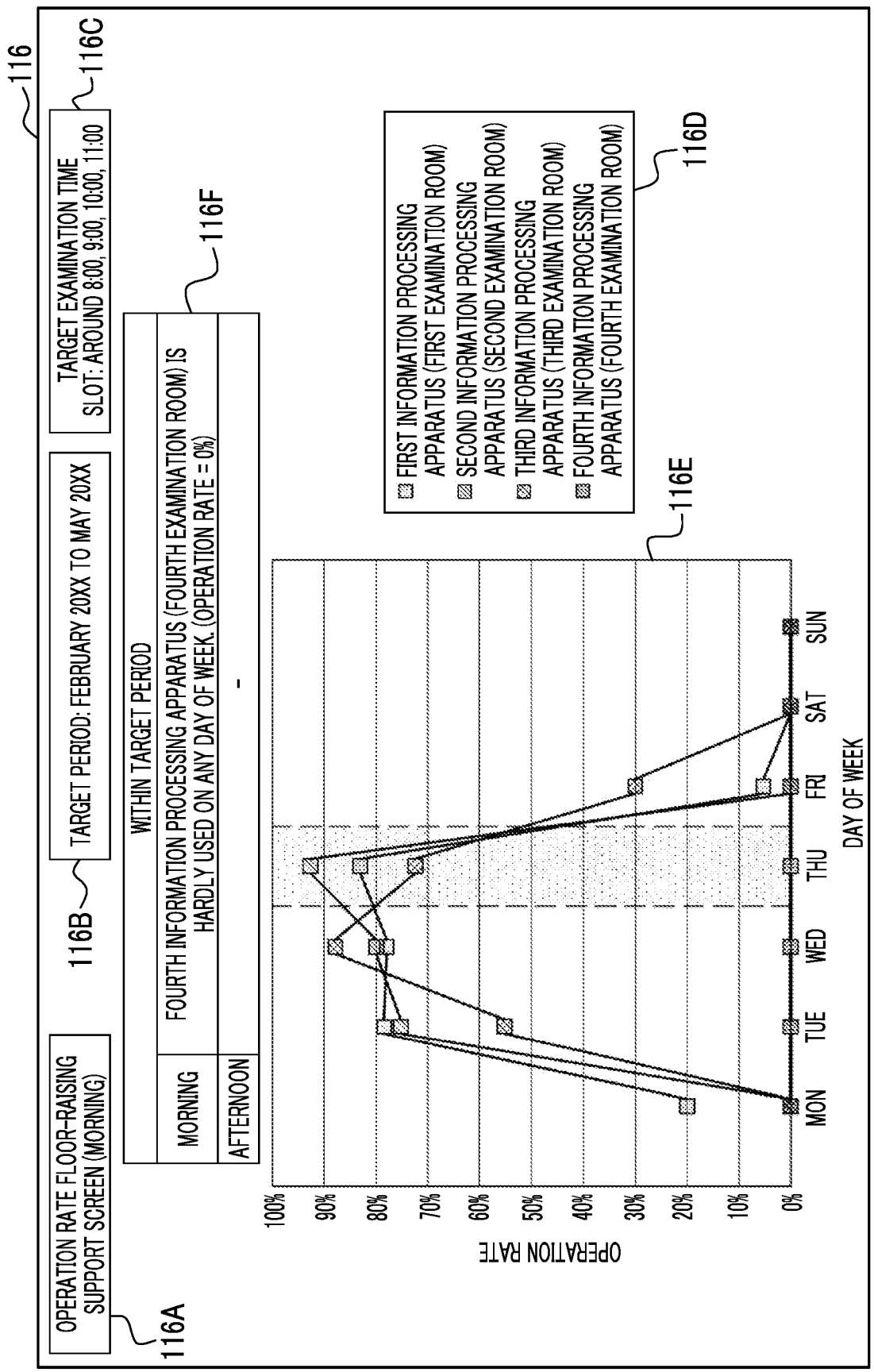
FIG. 14 is a screen view showing an example of the medical service support screen according to the second embodiment.

As an example, as shown in FIG. 14, on the medical service support screen 116, a screen title display field 116A, a target period display field 116B, a target examination time slot display field 116C, an explanatory note display field 116D, an examination support graph 116E, and a target period comment display field 116F are displayed.

In the screen title display field 116A, a title that can be recognized as a screen for supporting raising of the operation rate floor of the information processing apparatus 36 is displayed. In the example shown in FIG. 14, "operation rate floor-raising support screen (morning)" is displayed in the screen title display field 116A. In the example shown in FIG. 12, although a title that can be recognized as a screen that supports raising of the operation rate floor of the information processing apparatus 36 in the morning is displayed in the screen title display field 116A, for example, a title that can be recognized as a screen that supports raising of the operation rate floor of the information processing apparatus 36 in the afternoon is displayed in the screen title display field 116A according to the instruction received by the reception device 70. In this case, for example, "operation rate floor-raising support screen (afternoon)" is displayed in the screen title display field 116A.

The target period is displayed in the target period display field 116B in the same manner as in the target period display field 114B described in the first embodiment.

In the target examination time slot display field 116C, readable information is displayed that enables recognition of whether the examination support graph 116E and the comment, which is displayed in the target period comment display field 116F, are information based on the information processing apparatus morning operation rate or information based on the information processing apparatus afternoon operation rate. In the example shown in FIG. 14, the readable information such as "target examination time slot: around 8:00, 9:00, 10:00, 11:00" is displayed.

In the explanatory note display field 116D, an explanatory note related to the examination support graph 116E is displayed in the same manner as in the explanatory note display field 114D described in the first embodiment.

The examination support graph 116E is an example of a "figure" according to the present disclosed technology. The examination support graph 116E is a graph created based on the seventh notification information generated by executing the process of step ST300 shown in FIG. 13, and indicates the time change of the information processing apparatus operation rate. A horizontal axis of the examination support graph 116E is the day of the week, and a vertical axis of the examination support graph 116E is the information processing apparatus operation rate.

In the examination support graph 116E, a region corresponding to the day of the week which has the highest information processing apparatus operation rate in the morning within the target period is displayed in a manner distinguishable (in the example shown in FIG. 14, dot-shaped hatching surrounded by a broken line frame) from other regions. In the example shown in FIG. 14, "Thursday" is shown as an example of the examination time slot having the highest information processing apparatus operation rate in the morning. In the afternoon within the target period, similar display control is performed on the examination support graph 116E.

In the target period comment display field 116F, a comment, which is created based on the seventh notification information generated by executing the process of step ST300 shown in FIG. 11E, is displayed. The target period comment display field 116F is classified into a morning comment field and an afternoon comment field, a comment which is related to the morning for each day of the week within the target period is displayed in the morning comment field, and a comment which is related to the afternoon for each day of the week within the target period is displayed in the afternoon comment field. In the example shown in FIG. 14, a comment is displayed only in the morning comment field among the morning comment field and the afternoon comment field of the target period comment display field 116F. "The fourth information processing apparatus (fourth examination room) is hardly used on any day of the week. (Operation rate=0%)" is displayed in the morning comment field of the target period comment display field 116F.

As described above, in the medical service support device 20 according to the present second embodiment, information which includes the seventh notification information is generated by the generation unit 98F as the medical service support information, and the transmission unit 98B transmits the medical service support information to the endoscope part management device 12. In the endoscope part management device 12, the medical service support screen 116 is generated based on the seventh notification information included in the medical service support information and is displayed on the display 72. Since the seventh notification information is information in which the information processing apparatus operation rate for each day of the week within the target period with respect to each of all the information processing apparatuses 36 is notified of, the information processing apparatus operation rate for each day of the week within the target period is notified of through the medical service support screen 116. Therefore, according to the present configuration, the user or the like can ascertain on which day of the week within the target period there is room for increasing the operation rate of the information processing apparatus 36.

Third Embodiment

In the above second embodiment, although an example of the embodiment has been described in which each of the information processing apparatus operation rates in the morning and in the afternoon are displayed on the medical service support screen 116 in day of the week units within the target period, in a third embodiment, a case will be described in which the user or the like ascertains an availability of the examination room 30 based on the average number of examinations of each of all the examination rooms 30 within the target period. Further, in the present third embodiment, the same components as those in the first and second embodiments are designated by the same reference numerals, the description thereof will be omitted, and the parts different from those in the first and second embodiments will be described.

Figure 15:
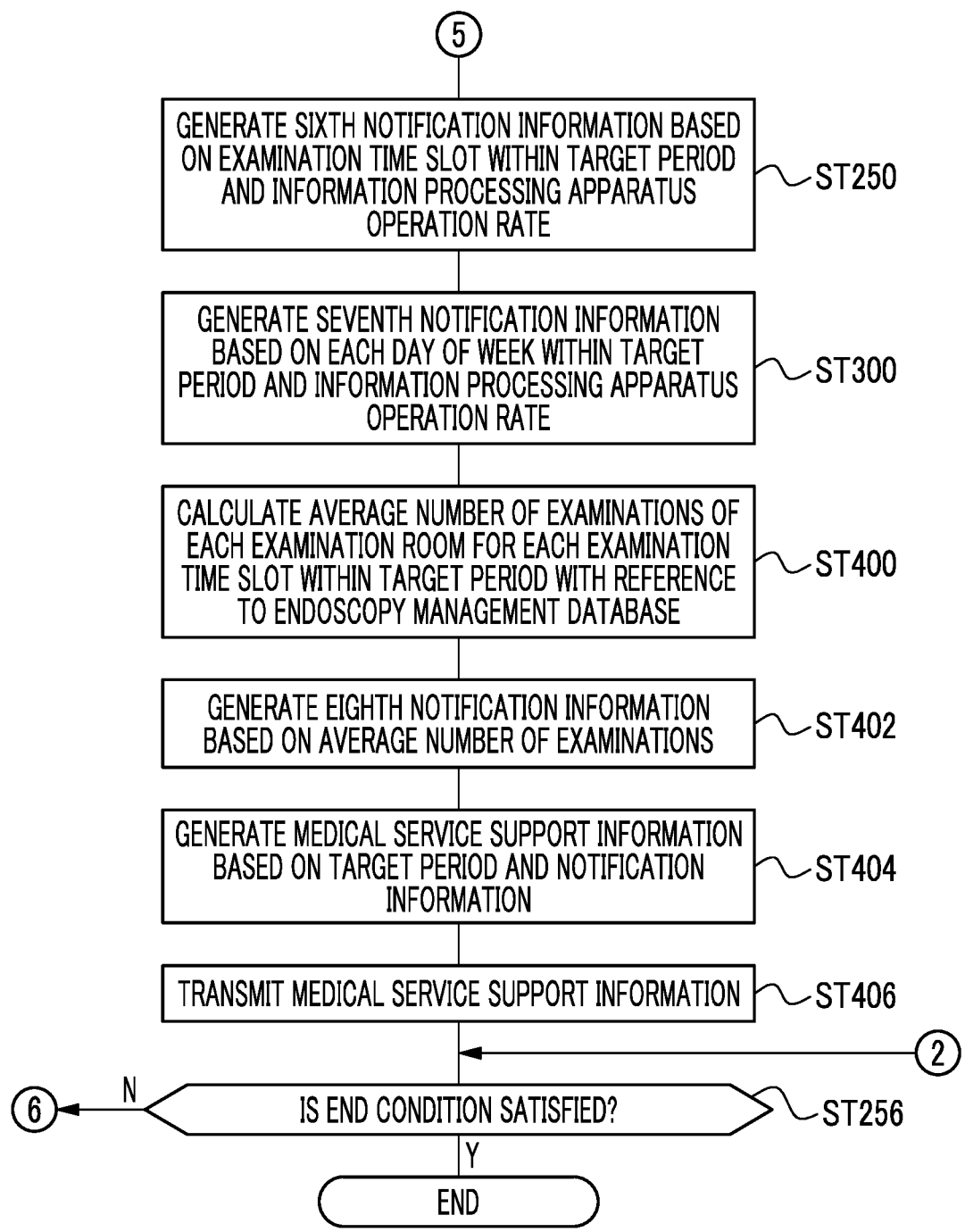
FIG. 15 is a flowchart showing an example of a flow of a medical service support process according to a third embodiment.

FIG. 15 shows an example of a flow of a medical service support process according to the present third embodiment.

As an example, as shown in FIG. 15, the medical service support process according to the present third embodiment differs from the medical service support process described in the second embodiment in that it has step ST400 to step ST406 instead of step ST302 and step ST304 in the flowchart shown in FIG. 13. Therefore, in the present third embodiment, steps that are the same as those included in the flowchart shown in FIG. 13 are given the same step numbers, the description thereof will be omitted, and steps of the flowchart shown in FIG. 15 different from those included in the flowchart shown in FIG. 13 will be described.

In the medical service support process shown in FIG. 15, in step ST400, the derivation unit 98E calculates the average number of examinations of each examination room 30 for each examination time slot within the target period with reference to the endoscopy management database 110. After the process in step ST400 is executed, the medical service support process proceeds to step ST402. The average number of examinations of each examination room 30 for each examination time slot within the target period is an example of the "low operation rate medical device related information" according to the present disclosed technology.

In step ST402, the generation unit 98F generates eighth notification information based on the average number of examinations calculated in step ST400. After the process in step ST402 is executed, the medical service support process proceeds to step ST404.

In present step ST402, the eighth notification information is an example of the "information for notifying of low operation rate medical device related information" according to the present disclosed technology and is information for notifying of the average number of examinations of each examination room 30 for each of the morning and the afternoon within the target period. Further, examples of the default unit include a time slot unit. The time slot unit indicates a unit classified by a predetermined time, and examples thereof include the morning within the target period and the afternoon within the target period. The predetermined time may be a time slot in any unit of several minutes to several hours. Further, the time slot may be limited to a time slot during which the medical device operates or is likely to operate, and may be, for example, at least a part of the examination time slot or an outpatient examination time slot of a medical installation facility. In the following, for convenience of explanation, the average number of examinations of each examination room 30 in the morning within the target period is referred to as "average number of examinations in the morning", and the average number of examinations of each examination room 30 in the afternoon within the target period is referred to as "average number of examinations in the afternoon".

In step ST404, the generation unit 98F generates the medical service support information based on the target period and on the notification information. After the process in step ST404 is executed, the medical service support process proceeds to step ST406.

The medical service support information includes the target period. Further, the medical service support information includes the notification information obtained by executing the process, among the process of step ST216, the process of step ST222, the process of step ST230, the process of step ST236, the process of step ST248, the process of step ST250, the process of step ST300, and the process of step ST402, by the generation unit 98F.

In step ST406, the transmission unit 98B transmits the medical service support information, which is generated in step ST404, to the endoscope part management device main body 68 via the communication I/F 104 (see FIG. 7). After the process in step ST406 is executed, the medical service support process proceeds to step ST256.

In a case where the medical service support information is transmitted by executing the process of step ST406, as described above, the medical service support information is received through the support device communication I/F 84 of the endoscope part management device 12 (see step ST110 shown in FIG. 10). As shown in step ST112 shown in FIG. 10, the display control unit 78D of the endoscope part management device 12 generates a medical service support screen 118 based on the medical service support information, and the generated medical service support screen 118 is displayed on the display 72 (FIG. 1 and FIG. 3) (see FIG. 16).

Figure 16:
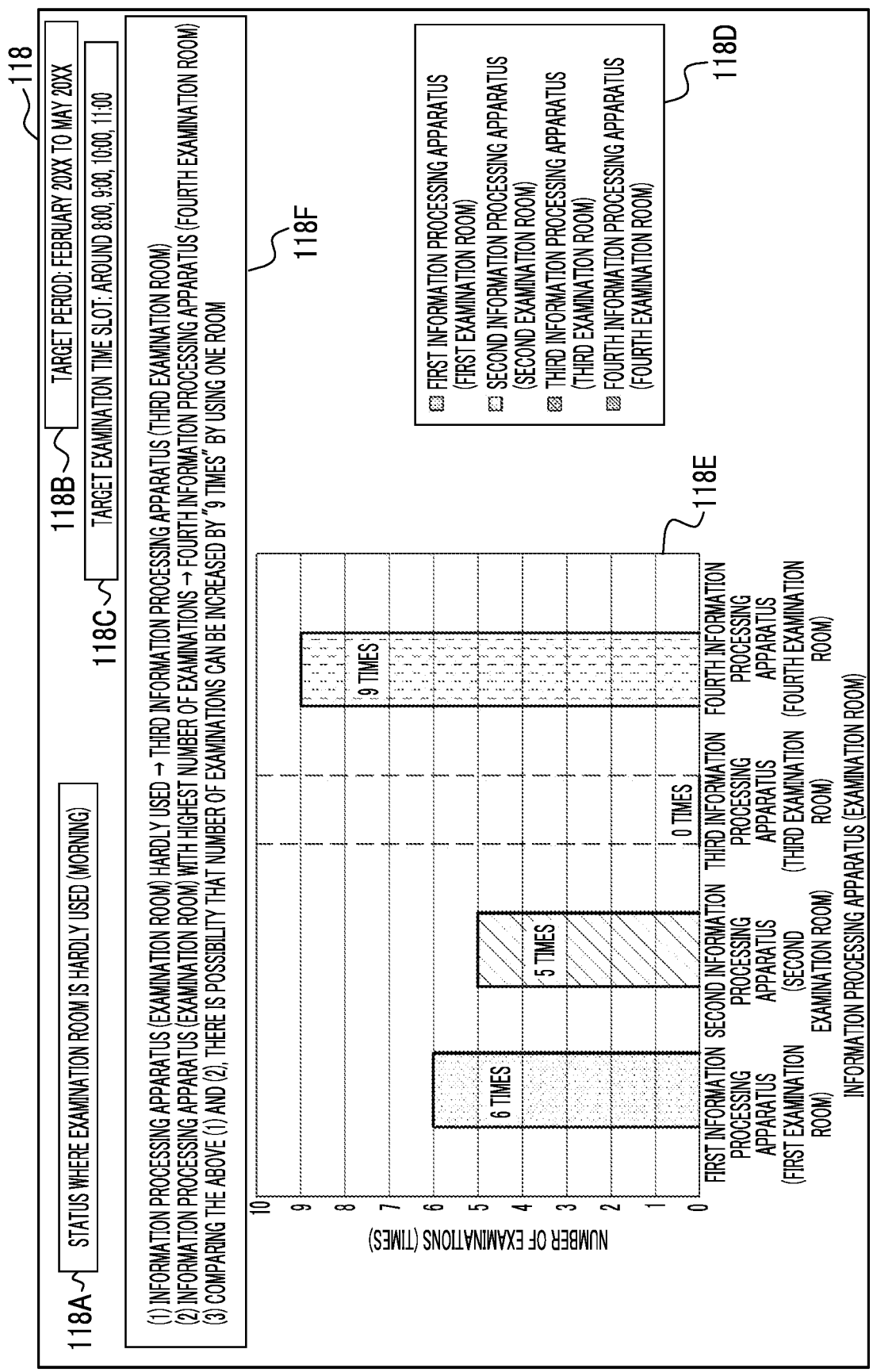
FIG. 16 is a screen view showing an example of the medical service support screen according to the third embodiment.

As an example, as shown in FIG. 16, on the medical service support screen 118, a screen title display field 118A, a target period display field 118B, a target examination time slot display field 118C, an explanatory note display field 118D, an examination support graph 118E, and an examination support comment display field 118F are displayed.

In the screen title display field 118A, a title that can be recognized as a screen that supports the improvement of a status in which the examination room is hardly used is displayed. In the example shown in FIG. 16, "Status where examination room is hardly used (morning)" is displayed in the screen title display field 118A. In the example shown in FIG. 16, although a title that can be recognized as a screen that supports the improvement of a status in which the examination room is hardly used in the morning is displayed in the screen title display field 118A, for example, a title that can be recognized as a screen that supports the improvement of a status in which the examination room is hardly used in the afternoon is displayed in the screen title display field 118A according to the instruction received by the reception device 70. In this case, for example, "Status where the examination room is hardly used (afternoon)" is displayed in the screen title display field 118A.

The target period is displayed in the target period display field 118B in the same manner as in the target period display field 116B described in the second embodiment.

In the target examination time slot display field 118C, readable information is displayed that enables recognition of whether the examination support graph 118E and the comment, which is displayed in the examination support comment display field 118F, are information based on the average number of examinations in the morning or information based on the average number of examinations in the afternoon. In the example shown in FIG. 16, the readable information such as "target examination time slot: around 8:00, 9:00, 10:00, 11:00" is displayed.

In the explanatory note display field 118D, an explanatory note related to the examination support graph 118E is displayed in the same manner as in the explanatory note display field 116D described in the second embodiment.

The examination support graph 118E is an example of a "figure" according to the present disclosed technology. The examination support graph 118E is a graph created based on the eighth notification information generated by executing the process of step ST402 shown in FIG. 16, and indicates the average number of examinations in the morning for each of the first to fourth examination rooms. A horizontal axis of the examination support graph 118E is information that is capable of specifying the information processing apparatus 36 (for example, the name of the information processing apparatus or the information processing apparatus ID), and a vertical axis of the examination support graph 118E is the average number of examinations in the morning.

In the examination support graph 118E, a region (for example, the background of the examination support graph 118E) corresponding to information that is capable of specifying the information processing apparatus 36 with the lowest average number of examinations in the morning within the target period is displayed in a manner distinguishable (in the example shown in FIG. 16, a broken line frame) from other regions. In the example shown in FIG. 16, the fourth information processing apparatus (fourth examination room) has the highest average number of examinations. In the afternoon within the target period, the examination support graph 118E, which is created based on the average number of examinations in the afternoon, is displayed in the medical service support screen 118.

In the examination support comment display field 118F, a comment, which is created based on the eighth notification information generated by executing the process of step ST402 shown in FIG. 16, is displayed. Examples of the comment, which is created based on the eighth notification information, include a comment for suggesting to what extent the number of examinations can be increased and/or a comment for suggesting the number of rooms needed to increase the number of examinations.

In the examination support comment display field 118F, a comment for specifying the information processing apparatus 36 (for example, the information processing apparatus 36 with the lowest average number of examinations) and the examination room 30 that are hardly used, a comment for specifying the information processing apparatus 36 and the examination room 30 with the highest average number of examinations, and a comment containing the absolute value of the difference between the highest average number of examinations and the lowest average number of examinations are displayed. In the example shown in FIG. 16, in the examination support comment display field 118F, a comment such as "(1) Information processing apparatus (examination room) hardly used→The third information processing apparatus (The third examination room)", a comment such as "(2) Information processing apparatus (examination room) with the highest number of examinations→The fourth information processing apparatus (The fourth examination room)", and a comment such as "(3) Comparing the above (1) and (2), there is a possibility that the number of examinations can be increased by '9 times' by using one room" are displayed.

As described above, in the medical service support device 20 according to the present third embodiment, information which includes the eighth notification information is generated by the generation unit 98F as the medical service support information, and the transmission unit 98B transmits the medical service support information to the endoscope part management device 12. In the endoscope part management device 12, the medical service support screen 118 is generated based on the eighth notification information included in the medical service support information and is displayed on the display 72. Since the eighth notification information is information in which the average number of examinations for each of all the information processing apparatuses 36 (all the examination rooms 30) within the target period is notified of, the average number of examinations for each of all the information processing apparatuses 36 (all the examination rooms 30) within the target period is notified of through the medical service support screen 118. Therefore, according to the present configuration, the user or the like can ascertain in which examination room 30 the number of endoscopies can be increased within the target period.

Fourth Embodiment

In the above third embodiment, although an example of the embodiment has been described in which the user or the like ascertains an availability of the examination room 30 based on the average number of examinations of each of all the examination rooms 30 within the target period, in a fourth embodiment, a case will be described in which the user or the like ascertains an availability of the examination room 30 based on the average number of examinations for each day of the week within the target period. Further, in the present fourth embodiment, the same components as those in the first to third embodiments are designated by the same reference numerals, the description thereof will be omitted, and the parts different from those in the first to third embodiments will be described.

Figure 17:
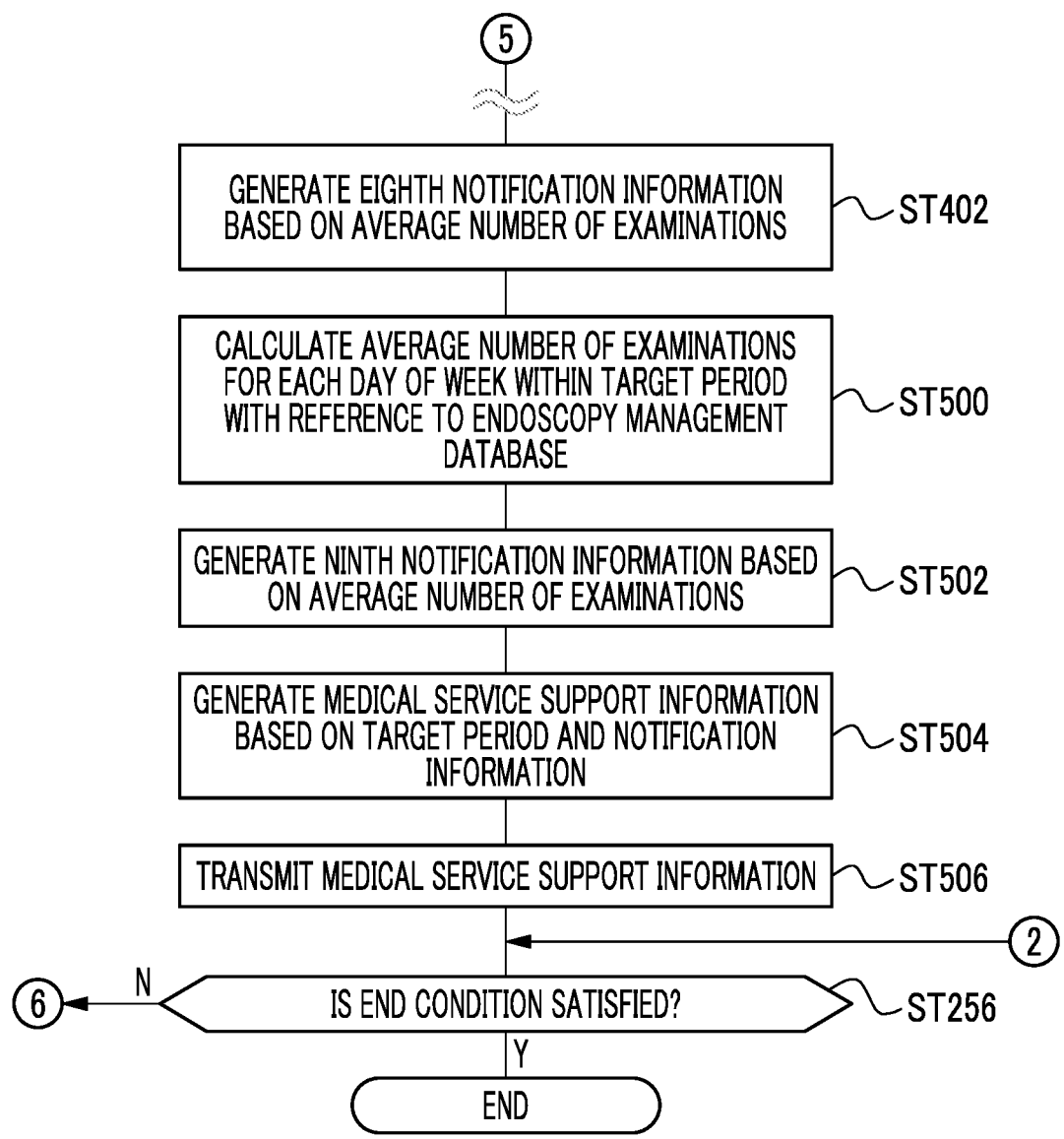
FIG. 17 is a flowchart showing an example of a flow of a medical service support process according to a fourth embodiment.

FIG. 17 shows an example of a flow of a medical service support process according to the present fourth embodiment.

As an example, as shown in FIG. 17, the medical service support process according to the present fourth embodiment differs from the medical service support process described in the third embodiment in that it has step ST500 to step ST506 instead of step ST404 and step ST406 in the flowchart shown in FIG. 15. Therefore, in the present fourth embodiment, steps that are the same as those included in the flowchart shown in FIG. 15 are given the same step numbers, the description thereof will be omitted, and steps of the flowchart shown in FIG. 17 different from those included in the flowchart shown in FIG. 15 will be described.

In the medical service support process shown in FIG. 17, in step ST500, the derivation unit 98E calculates the average number of examinations of endoscopies performed in all the examination rooms 30 for each day of the week within the target period with reference to the endoscopy management database 110. After the process in step ST500 is executed, the medical service support process proceeds to step ST502. The average number of examinations for each day of the week within the target period is an example of the "low operation rate medical device related information" according to the present disclosed technology.

In step ST502, the generation unit 98F generates ninth notification information based on the average number of examinations calculated in step ST500. After the process in step ST502 is executed, the medical service support process proceeds to step ST504.

In present step ST502, the ninth notification information is an example of the "information for notifying of low operation rate medical device related information" according to the present disclosed technology and is information for notifying of the average number of examinations for each of the morning and the afternoon for each day of the week within the target period. Each of the morning within the target period and the afternoon within the target period is an example of the "default unit" and the "time slot" according to the present disclosed technology. In the following, for convenience of explanation, the average number of examinations in the morning for each day of the week within the target period is referred to as "average number of examinations in the morning by day of the week", and the average number of examinations in the afternoon for each day of the week within the target period is referred to as "average number of examinations in the afternoon by day of the week".

In step ST504, the generation unit 98F generates the medical service support information based on the target period and on the notification information. After the process in step ST504 is executed, the medical service support process proceeds to step ST506.

The medical service support information includes the target period. Further, the medical service support information includes the notification information obtained by executing the process, among the process of step ST216, the process of step ST222, the process of step ST230, the process of step ST236, the process of step ST248, the process of step ST250, the process of step ST300, the process of step ST402, and the process of step ST502, by the generation unit 98F.

In step ST506, the transmission unit 98B transmits the medical service support information, which is generated in step ST504, to the endoscope part management device main body 68 via the communication I/F 104 (see FIG. 7). After the process in step ST506 is executed, the medical service support process proceeds to step ST256.

In a case where the medical service support information is transmitted by executing the process of step ST506, as described above, the medical service support information is received through the support device communication I/F 84 of the endoscope part management device 12 (see step ST110 shown in FIG. 10). As shown in step ST112 shown in FIG. 10, the display control unit 78D of the endoscope part management device 12 generates the medical service support screen 120 based on the medical service support information, and the generated medical service support screen 120 is displayed on the display 72 (FIG. 1 and FIG. 3) (see FIG. 18).

Figure 18:
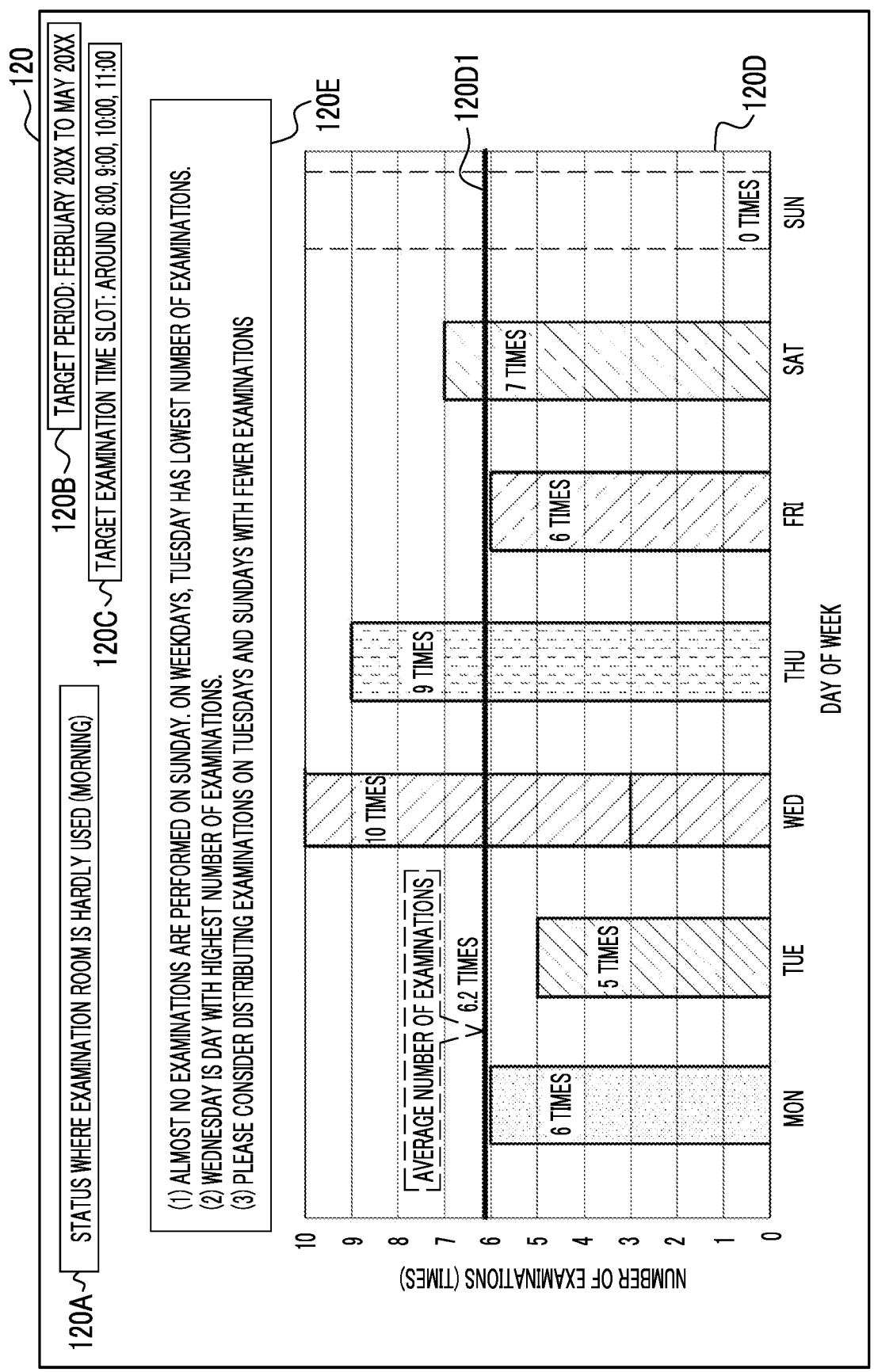
FIG. 18 is a screen view showing an example of the medical service support screen according to the fourth embodiment.

As an example, as shown in FIG. 18, on the medical service support screen 120, a screen title display field 120A, a target period display field 120B, a target examination time slot display field 120C, an examination support graph 120D, and an examination support comment display field 120E are displayed.

The screen title display field 120A corresponds to the screen title display field 118A described in the third embodiment. The target period display field 120B corresponds to the target period display field 118B described in the third embodiment. The target examination time slot display field 120C corresponds to the target examination time slot display field 118C described in the third embodiment.

The examination support graph 120D is an example of a "figure" according to the present disclosed technology. The examination support graph 120D is a graph created based on the ninth notification information generated by executing the process of step ST502 shown in FIG. 17, and indicates the average number of examinations in the morning for each day of the week within the target period. A horizontal axis of the examination support graph 120D is a day of the week, and a vertical axis of the examination support graph 120D is the average number of examinations in the morning by day of the week.

In the examination support graph 120D, a region (for example, the background of the examination support graph 120D) corresponding to the day of the week with the lowest average number of examinations in the morning by day of the week is displayed in a manner distinguishable (in the example shown in FIG. 18, a broken line frame) from other regions. In the example shown in FIG. 18, "Sunday" has the highest average number of examinations in the morning by day of the week, and "Wednesday" has the lowest average number of examinations in the morning by day of the week. In the afternoon within the target period, the examination support graph 120D, which is created based on the average number of examinations in the afternoon by day of the week, is displayed in the medical service support screen 120.

Further, a line 120D1 (a line parallel to the horizontal axis) showing an average value of all average examination times by day of the week from Monday to Sunday is displayed in the examination support graph 120D. Further, an average value (6.2 times in the example shown in FIG. 18) of all average examination times by day of the week from Monday to Sunday is also displayed as a numerical value in the vicinity of the line 120D1.

In the examination support comment display field 120E, a comment, which is created based on the ninth notification information generated by executing the process of step ST502 shown in FIG. 17, is displayed. Examples of the comment, which is created based on the ninth notification information, include a comment for suggesting to what extent the number of examinations can be increased and/or a comment for suggesting which day of the week the number of examinations can be increased.

In the examination support comment display field 120E, a comment related to the day of the week on which examination is hardly performed, a comment related to the day of the week with the highest number of examinations, and a comment for suggesting to equalize the days of the week on which an endoscopy is performed are displayed.

In the example shown in FIG. 18, in the examination support comment display field 120E, a comment such as "(1) Almost no examinations are performed on Sunday. On weekdays, Tuesday has the lowest number of examinations", a comment such as "(2) Wednesday is the day with the highest number of examinations", and a comment such as "(3) Please consider distributing examinations on Tuesdays and Sundays with fewer examinations" are displayed.

As described above, in the medical service support device 20 according to the present fourth embodiment, information which includes the ninth notification information is generated by the generation unit 98F as the medical service support information, and the transmission unit 98B transmits the medical service support information to the endoscope part management device 12. In the endoscope part management device 12, the medical service support screen 120 is generated based on the ninth notification information included in the medical service support information and is displayed on the display 72. Since the ninth notification information is information for notifying of the average number of examinations in the morning by day of the week, the average number of examinations in the morning by day of the week is notified of through the medical service support screen 120. Therefore, according to the present configuration, the user or the like can ascertain on which day of the week and to what extent the number of endoscopies can be increased.

The medical service support screens 114, 116, 118, and 120 may be switched according to, for example, an instruction received by the reception device 70 or may be switched after a lapse of a certain period of time.

In each of the embodiments described above, although an example of the embodiment has been described in which the date on which an endoscopy is performed the highest number of times is defined as the peak operation date, the present disclosed technology is not limited to this. For example, the peak operation date may be a date on which the number of times the examination standby time (see FIG. 2) falls below the second reference value (also referred to as a threshold value, for example, 3 minutes) is equal to or greater than a reference number of times. In this case, it is possible to specify the peak operation date even in a case where the number of times an endoscopy is performed cannot be ascertained. In other words, the operation degree of the medical device may be indicated by a value based on the number of times the examination standby time falls below the second reference value, and the second reference degree may be indicated by the reference number of times. The number of times the examination standby time falls below the second reference value indicates the number of times the examination standby time for each predetermined period, such as for each day or for each hour, falls below the second reference value. Further, in a case where an operation degree of the medical device is defined as the number of times the examination standby time falls below the second reference value, and in a case where there are a plurality of medical devices that can be acquired by the medical service support device, the overall operation degree indicates the total number of times the examination standby time falls below the second reference value in the plurality of medical devices. The second reference value may correspond to a preparation period required from the endoscopy end to the next endoscopy start in a medical installation facility, may be a fixed value, or may be a variable value set or changed by the user or the like. Further, the second reference value may be a variation value calculated based on the examination standby time of the endoscope procedure service performed in the past. For example, the average value of the examination standby time of the endoscope procedure service performed in the past, the minimum value of the examination standby time of the endoscope procedure service performed in the past, or a value obtained by adding or multiplying a predetermined value to the minimum value may be used. Further, the reference number of times corresponding to the second reference degree is a default value. More specifically, it is a default value for determining a period during which endoscopy is intensively performed, such as the peak date or the peak time. The default value may be a fixed value set in advance, or a variable value changed according to a user input. Further, the default value may be a variation value calculated based on the number of times the examination standby time in the past falls below the second reference value. For example, the default value may be an average value of the number of times the examination standby time in the past falls below the second reference value or a variation value calculated based on the number of times the examination standby time in the past falls below the second reference value, for example, the maximum value of the number of times the examination standby time in the past falls below the second reference value or a value obtained by adding or multiplying a predetermined value to the maximum value. Further, in a case where the operation degree of the medical device indicates the number of times the examination standby time falls below the second reference value for each first period (for example, one day), the highest value, which is within the number of times the examination standby time falls below the second reference value for each first period in a second period (for example, one week) longer than the first period, may be set as a default value. Furthermore, in a case where the operation degree of the medical device is defined as a value based on the number of times the examination standby time falls below the second reference value, the standard operation degree may be a value based on the number of times the examination standby time for each medical device falls below the second reference value, during a specific period in which the total number of times the examination standby time falls below the second reference value for a predetermined period is equal to or greater than the reference number of times, in the plurality of medical devices.

In each of the embodiments described above, although an example of the embodiment has been described in which information (for example, an explanatory note) that is capable of specifying a medical device is displayed on the medical service support screens 114, 116, and 118, the present disclosed technology is not limited to this, and other information related to a medical device, such as a manufacturing time period of the medical device and/or the number of cumulative uses of the medical device, may be displayed on the medical service support screens 114, 116, and 118, instead of the information that is capable of specifying the medical device or together with the information that is capable of specifying the medical device.

In each of the embodiments described above, although an example of supporting an endoscope handling service in an endoscope part has been described, the present disclosed technology is not limited to this, and the present disclosed technology is applicable even in a case of supporting the endoscope handling service in a clinical department (for example, internal medicine or surgery) or a medical institution (for example, clinic or general hospital).

In each of the embodiments described above, although the examination room 30 has been exemplified as an example, it does not necessarily have to be one room, and may be a space obtained by dividing one room by a curtain and/or a stand or the like.

In each of the embodiments described above, although the endoscope processor device 32 and the information processing apparatus 36 are separate units, the present disclosed technology is not limited to this, and the endoscope processor device 32 and the information processing apparatus 36 may be integrated. In this case, for example, a device corresponding to the information processing apparatus 36 may be incorporated into the endoscope processor device 32, or a device corresponding to the endoscope processor device 32 may be incorporated into the information processing apparatus main body 38.

In each of the embodiments described above, although an example of the embodiment has been described in which the medical service support information is visualized and presented to the user or the like by displaying the medical service support screens 114, 116, and 118 on the display 72, the present disclosed technology is not limited to this. For example, the medical service support information may be audibly output by a sound reproducing device, or the medical service support information may be printed on a recording medium (for example, paper) by a printer and output, instead of or together with the visual presentation by the display 72 described above.

In each of the embodiments described above, although the endoscope handling service including an endoscopy, which is an example of the "endoscope procedure service" according to the present disclosed technology, has been described, the present disclosed technology is not limited to this, and a medical device handling service including a medical device procedure service other than an endoscopy may be used. For example, the endoscope procedure service may be a service including endoscopic surgery and/or endoscopic treatment. Examples of endoscopic surgery include laparoscopic surgery and/or treatment, thoracoscopic surgery and/or treatment, cystoscopic surgery and/or treatment, choledoscopic surgery and/or treatment, spinal endoscopy and/or therapy, angioscopy surgery and/or treatment, and epidural endoscopic surgery and/or treatment.

In each of the embodiments described above, although the information processing apparatus 36 is described as an example of the "medical device" according to the present disclosed technology, the present disclosed technology is not limited to this, and the medical device may be the endoscope 24 or the washer 52, or may be a medical device other than the endoscope 24, the information processing apparatus 36, and the washer 52. Examples of the medical device other than the endoscope 24, the information processing apparatus 36, and the washer 52 include a medical management device (for example, a device having a processor and a memory) corresponding to the information processing apparatus 36, a medical accessory device that is attachably and detachably connected to a medical management device in the same way that the endoscope 24 is attachably and detachably connected to the information processing apparatus 36 (for example, replaceable ultrasonic probes and/or replaceable therapeutic tools used in dental treatment, or the like), and a washer that washes the medical accessory device similar to the washer 52 that washes the endoscope 24.

In each of the embodiments described above, although the barcode 42 and the subject barcode are exemplified, another two-dimensional code such as a quick response (QR) code (registered trademark) may be used, or a noncontact storage medium using radio frequency identification (RFID) technology may be used, instead of at least one of the barcode 42 or the subject barcode. Further, in this case, the endoscope 24 or a device that can acquire information which is capable of specifying a subject may be applied by recognizing these two-dimensional codes and/or noncontact storage media instead of the barcode readers 40 and 64.

An example has been described in which the start operation and the stop operation of the information processing apparatus 36 are executed by pressing down the examination start button 38A, but this is merely an example. The examination start button 38A is not limited to a physical button. The operation of the information processing apparatus 36 may be started or the operation of the information processing apparatus 36 may be stopped by detecting nearness of at least one softkey displayed on a touch panel, such as a touch panel display. Further, the start operation and the stop operation of the information processing apparatus 36 may be controlled by a voice input and/or a gesture input. Further, a noncontact human sensor may be provided in a default region of the examination room 30 or the information processing apparatus 36, and the operation of the information processing apparatus 36 may be started or the operation of the information processing apparatus 36 may be stopped by causing the noncontact human sensor to detect a human body. The same applies to the control of the start operation and the stop operation by using the washing start button 60A of the washer 52.

In each of the embodiments described above, although the medical service support device 20 is exemplified, a computer, which is used together with the endoscope part management device 12 on-premises, may be caused to execute the medical service support processing program 108 (see FIG. 8) instead of the medical service support device 20. Further, the management information storage device 76 may also be used on-premises together with the endoscope part management device 12.

Further, in each of the embodiments described above, although an example of the embodiment has been described in which the medical service support processing program 108 is stored in the storage 100, the medical service support processing program 108 may be stored in any portable storage medium such as an SSD or universal serial bus (USB) memory, or the medical service support processing program 108 may be stored in a non-temporary storage medium. The medical service support processing program 108 stored in the non-temporary storage medium is installed, for example, in the support device server 74 or the like.

Further, in each of the embodiments described above, although the support device server 74 including the CPU 98, the storage 100, and the memory 102 has been exemplified, the present disclosed technology is not limited to this, and a device including an application specific integrated circuit (ASIC), a field-programmable gate array (FPGA), and/or a programmable logic device (PLD) may be applied instead of the support device server 74 or together with the support device server 74.

As a hardware resource for executing the medical service support process described in each of the above embodiments, the following various processors can be used. Examples of the processor include a CPU, which is a general-purpose processor that functions as a hardware resource for executing the medical service support process by executing software, that is, a program. Further, examples of the processor include a dedicated electric circuit, which is a processor having a circuit configuration specially designed for executing specific processing such as an FPGA, a PLD, or an ASIC. Any processor has a memory built in or connected to it, and any processor uses the memory to execute a terminal side process.

The hardware resource for executing the medical service support process may be configured with one of these various processors or may be configured with a combination (for example, a combination of a plurality of FPGAs or a combination of a CPU and an FPGA) of two or more processors of the same type or different types. Further, the hardware resource for executing the medical service support process may be one processor.

As an example of a configuration with one processor, first, one processor is configured with a combination of one or more CPUs and software, and there is an embodiment in which this processor functions as a hardware resource for executing the medical service support process. Secondly, as typified by a system-on-a-chip (SoC), there is an embodiment in which a processor that implements the functions of the entire system including a plurality of hardware resources for executing the medical service support process with one IC chip is used. As described above, the medical service support process is implemented by using one or more of the above-mentioned various processors as a hardware resource.

Further, as the hardware-like structure of these various processors, more specifically, an electric circuit in which circuit elements such as semiconductor elements are combined can be used. Further, the above-mentioned terminal side process is merely an example. Therefore, it goes without saying that unnecessary steps may be deleted, new steps may be added, or the processing order may be changed within a range that does not deviate from the purpose.

The contents described above and the contents shown in the illustrations are detailed explanations of the parts related to the present disclosed technology and are merely an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustrations, within the range that does not deviate from the purpose of the present disclosed technology. Further, in order to avoid complications and facilitate understanding of the parts of the present disclosed technology, in the contents described above and the contents shown in the illustrations, the descriptions related to common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

Further, the following Supplementary Notes will be disclosed with respect to the above embodiments.
(Supplementary Note 1)

A medical service support device includes: a processor; and a memory that is connected to or built into the processor, in which the processor is configured to: acquire low operation rate medical device specification information capable of specifying a low operation rate medical device, which is a medical device of which a standard operation degree falls below a threshold value among a plurality of medical devices used in a medical device handling service; and output medical service support information obtained based on the low operation rate medical device specification information.

According to the configuration described in Supplementary Note 1, it is possible to support the efficient performance of the medical device handling service.

What is claimed is:

1. A medical service support device comprising:
a processor; and
a memory that is connected to or built into the processor, and
a communication interface connected to a plurality of medical devices provided in each of a plurality of medical sites and used in an endoscope handling service, and configured to control exchange of information between the processor and the plurality of medical devices,
wherein the processor is configured to:
acquire management target information from each of the plurality of medical devices through the communication interface and accordingly determine a standard operation degree of each of the plurality of medical devices;
in response to an overall operation degree of the plurality of medical devices being equal to or higher than a reference degree, determine whether or not a support screen display condition, which is a condition for displaying a medical service support screen on a presentation device, is satisfied,
having determined that the support screen display condition is satisfied, generate the medical service support screen by using medical service support information, wherein the medical service support information is obtained based on low operation rate medical device specification information, wherein the low operation rate medical device specification information includes information capable of specifying a low operation rate medical device for a time period and the low operation rate medical device specification information is used to determine a medical device of which the standard operation degree falls below a threshold value among the plurality of the medical devices as the low operation rate medical device; and
display the medical service support information on the presentation device for the time period—wherein the medical service support information includes information showing the medical service support screen for notifying of the low operation rate medical device that is specified based on the low operation rate medical device specification information;
wherein at least one of a screen title display field, a target period display field, a low operation rate device quantity display field, an explanatory note display field, an examination support graph, a target period comment display field, a peak time slot comment display field, a first specific examination time slot comment display field, a second specific examination time slot comment display field, a third specific examination time slot comment display field, or a fourth specific examination time slot comment display field are displayed on the medical service support screen.

2. The medical service support device according to claim 1,
wherein the standard operation degree is a value based on operation time of the medical device during the time period when the overall operation degree is equal to or higher than the reference degree.

3. The medical service support device according to claim 1,
wherein the endoscope handling service includes an endoscope procedure service, and
the time period when the overall operation degree is equal to or higher than the reference degree is a time period when a value based on the number of endoscope procedure services is equal to or greater than a first reference value.

4. The medical service support device according to claim 1,
wherein the endoscope handling service includes an endoscope procedure service, and
the time period when the overall operation degree is equal to or higher than the reference degree is a time period when the number of times standby time for the endoscope procedure service falls below a second reference value is equal to or greater than a reference number of times.

5. The medical service support device according to claim 1,
wherein the medical service support information is information capable of being classified by a default unit.

6. The medical service support device according to claim 5,
wherein the default unit is related information that is related to the medical device.

7. The medical service support device according to claim 5,
wherein the default unit is a time slot.

8. The medical service support device according to claim 7,
wherein the time slot is a time slot defined with start or end of at least one of morning, afternoon, or all day as a starting point.

9. The medical service support device according to claim 1,
wherein the medical service support information includes information for notifying of low operation rate medical device related information that is related to the low operation rate medical device specified based on the low operation rate medical device specification information.

10. The medical service support device according to claim 9,
wherein the processor is configured to acquire a quantity of the low operation rate medical devices specified based on the low operation rate medical device specification information, and
the low operation rate medical device related information includes information obtained based on the quantity of the low operation rate medical devices.

11. The medical service support device according to claim 9,
wherein the processor is configured to acquire medical device quantity information obtained based on a quantity of the medical devices that are in operation among the plurality of medical devices, and
the medical service support information includes information for notifying of the medical device quantity information in a comparable state with the low operation rate medical device related information.

12. The medical service support device according to claim 9,
wherein the processor is configured to acquire an operation rate of the low operation rate medical device specified based on the low operation rate medical device specification information, and
the low operation rate medical device related information includes information obtained based on the operation rate of the low operation rate medical device.

13. The medical service support device according to claim 12,
wherein the processor is configured to acquire medical device operation rate information obtained based on an operation rate of the medical device that is in operation among the plurality of medical devices, and
the medical service support information includes information for notifying of the medical device operation rate information in a comparable state with the low operation rate medical device related information.

14. The medical service support device according to claim 1,
wherein the medical service support information is information capable of being represented via at least one of a comment, a diagram, or a table by a presentation device.

15. The medical service support device according to claim 1,
wherein the medical device is any one of an endoscope, an information processing apparatus used together with the endoscope, or a washer that washes the endoscope.

16. A medical service support method comprising:
controlling exchange of information between a processor and a plurality of medical devices by a communication interface, the communication interface connected to the plurality of medical devices provided in each of a plurality of medical sites and used in an endoscope handling service,
acquiring management target information from each of the plurality of medical devices through the communication interface and accordingly determining a standard operation degree of each of the plurality of medical devices;
in response to an overall operation degree of the plurality of medical devices being equal to or higher than a reference degree, determining whether or not a support screen display condition, which is a condition for displaying a medical service support screen on a presentation device, is satisfied,
having determined that the support screen display condition is satisfied, generating the medical service support screen by using medical service support information, wherein the medical service support information is obtained based on low operation rate medical device specification information, wherein the—low operation rate medical device specification information includes information capable of specifying a low operation rate medical device for a time period the low operation rate medical device specification information is used to determine a medical device of which the standard operation degree falls below a threshold value among the plurality of the medical devices as the low operation rate medical device; and
displaying the medical service support information on the presentation device for the time period, wherein the medical service support information includes information showing the medical service support screen for notifying of the low operation rate medical device that is specified based on the low operation rate medical device specification information;

wherein at least one of a screen title display field, a target period display field, a low operation rate device quantity display field, an explanatory note display field, an examination support graph, a target period comment display field, a peak time slot comment display field, a first specific examination time slot comment display field, a second specific examination time slot comment display field, a third specific examination time slot comment display field, or a fourth specific examination time slot comment display field are displayed on the medical service support screen.

17. A non-transitory computer-readable storage medium storing a program executable by a computer to perform a process comprising:

controlling exchange of information between a processor and a plurality of medical devices by a communication interface, the communication interface connected to the plurality of medical devices provided in each of a plurality of medical sites and used in an endoscope handling service, acquiring management target information from each of the plurality of medical devices through the communication interface and accordingly determining a standard operation degree of each of the plurality of medical devices;

in response to an overall operation degree of the plurality of medical devices being equal to or higher than a reference degree, determining whether or not a support screen display condition, which is a condition for displaying a medical service support screen on a presentation device, is satisfied, having determined that the support screen display condition is satisfied, generating the medical service support screen by using medical service support information, wherein the medical service support information is obtained based on low operation rate medical device specification information, wherein the low operation rate medical device specification information includes information capable of specifying a low operation rate medical device for a time period and the low operation rate medical device specification information is used to determine a medical device of which the standard operation degree falls below a threshold value among the plurality of the medical devices as the low operation rate medical device; and displaying the medical service support information on the presentation device for the time period, wherein the medical service support information includes information for notifying of the low operation rate medical device that is specified based on the low operation rate medical device specification information;

wherein at least one of a screen title display field, a target period display field, a low operation rate device quantity display field, an explanatory note display field, an examination support graph, a target period comment display field, a peak time slot comment display field, a first specific examination time slot comment display field, a second specific examination time slot comment display field, a third specific examination time slot comment display field, or a fourth specific examination time slot comment display field are displayed on the medical service support screen.

* * * * *